(12) United States Patent
Endou et al.

(10) Patent No.: US 10,596,669 B2
(45) Date of Patent: Mar. 24, 2020

(54) MACHINING SYSTEM

(71) Applicant: FANUC CORPORATION, Yamanashi (JP)

(72) Inventors: Taiki Endou, Yamanashi (JP); Masanori Itou, Yamanashi (JP)

(73) Assignee: FANUC CORPORATION, Yamanashi (JP)

( * ) Notice: Subject to any disclaimer, the term of this patent is extended or adjusted under 35 U.S.C. 154(b) by 0 days.

(21) Appl. No.: 16/004,468

(22) Filed: Jun. 11, 2018

(65) Prior Publication Data

US 2019/0022809 A1   Jan. 24, 2019

(30) Foreign Application Priority Data

Jul. 19, 2017 (JP) ................................. 2017-139713

(51) Int. Cl.
*B23Q 3/18* (2006.01)
*B23Q 11/08* (2006.01)
(Continued)

(52) U.S. Cl.
CPC .......... *B23Q 3/183* (2013.01); *B23Q 11/0891* (2013.01); *B23Q 15/007* (2013.01); *G05B 19/18* (2013.01)

(58) Field of Classification Search
CPC ............ B23Q 11/0085; B23Q 11/0089; B23Q 11/0078; B23Q 15/20; B23Q 15/007; B23Q 17/007
See application file for complete search history.

(56) References Cited

U.S. PATENT DOCUMENTS 9,383,061 B2 * 7/2016 Matsumoto ........ B23Q 11/0085
2015/0308176 A1 * 10/2015 Oda ......................... E05F 15/40
49/31

FOREIGN PATENT DOCUMENTS

JP      2005-103690 A      4/2005
JP      2005103690 A *     4/2005
(Continued)

OTHER PUBLICATIONS

English translation of JP 2005103690 A, Apr. 2005 (Year: 2005).*
(Continued)

*Primary Examiner* — Alan Snyder
(74) *Attorney, Agent, or Firm* — Studebaker & Brackett PC

(57) ABSTRACT

A machining system comprises a machine tool, a machine tool controller that controls the machine tool, an auxiliary device that assists the machine tool, and an auxiliary device controller that controls the auxiliary device. The machine tool and the auxiliary device work cooperatively for machining. The machining system comprises a signal management unit that receives a first signal and a second signal. The first signal indicates information about the machine tool as a criterion used for determining whether the machine tool and the auxiliary device are operable or inoperable. The second signal indicates information about the auxiliary device as a criterion used for determining whether the machine tool and the auxiliary device are operable or inoperable. The signal management unit outputs a third signal indicating an operable state or an inoperable state of the machine tool and the auxiliary device to the machine tool controller and the auxiliary device controller based on the first signal and the second signal.

9 Claims, 24 Drawing Sheets

(51) Int. Cl.
*G05B 19/18* (2006.01)
*B23Q 15/007* (2006.01)

(56) References Cited

FOREIGN PATENT DOCUMENTS

| | | |
|---|---|---|
| JP | 2010-064158 A | 3/2010 |
| JP | 2014-205231 A | 10/2014 |
| JP | 2015-205385 A | 11/2015 |

OTHER PUBLICATIONS

An Office Action mailed by the Japanese Patent Office dated May 7, 2019, which corresponds to Japanese Patent Application No. 2017-139713 and is related to U.S. Appl. No. 16/004,468.

\* cited by examiner

| MACHINING CENTER | | ROBOT SAFETY GATE | MACHINING CENTER OPERABLE/ INOPERABLE | ROBOT OPERABLE/ INOPERABLE |
|---|---|---|---|---|
| FRONT DOOR | SIDE DOOR | | | |
| CLOSED | CLOSED | CLOSED | ○ | ○ |
| CLOSED | CLOSED | OPEN | ○ | × |
| CLOSED | OPEN | CLOSED | ○ | ○ |
| CLOSED | OPEN | OPEN | × | × |
| OPEN | CLOSED | CLOSED | × | ○ |
| OPEN | CLOSED | OPEN | × | × |
| OPEN | OPEN | CLOSED | × | × |
| OPEN | OPEN | OPEN | × | × |

○ : OPERABLE   × : INOPERABLE

FIG. 3

MACHINING SYSTEM

This application is based on and claims the benefit of priority from Japanese Patent Application No. 2017-139713, filed on 19 Jul. 2017, the content of which is incorporated herein by reference.

BACKGROUND OF THE INVENTION

Field of the Invention

The present invention relates to a machining system in which a machine tool and an auxiliary device work cooperatively for machining.

Related Art

There has been a machining system conventionally known in which a machine tool and an auxiliary device that assists the machine tool constitute a machining cell, and the machine tool and the auxiliary device work cooperatively for machining (see patent document 1, for example).

FIG. 20 is a schematic view showing an example of the conventional machining system. FIG. 21 is a block diagram showing a relationship between the machine tool and the auxiliary device. In this example, a machining center and a robot are illustrated as examples of the machine tool and the auxiliary device respectively.

A machining center 100 has a front door 102 and a side door 103 as openable/closable doors for access to the interior of a housing 101. The front door 102 is a door for access for a worker. The side door 103 is a door for access (work) for a robot 200. The robot 200 has a safety gate 201 for safety of the worker provided around the robot 200. The safety gate 201 is a gate provided to separate a path for access to the robot 200 by the worker and the periphery of the robot 200.

As shown in FIG. 21, open/close information about the front door 102 (front door information S100a) and open/close information about the side door 103 (side door information S100b) at the machining center 100 are acquired by a controller 104 at the machining center 100. Open/close information about the safety gate 201 (safety gate information S200) at the robot 200 is acquired by a controller 202 at the robot 200.

As shown in FIG. 21, in such a machining system, the controller 104 at the machining center 100 and the controller 202 at the robot 200 are communicatively connected. In the machining system, the front door information S100a and the side door information S100b about the machining center 100, and the safety gate information S200 about the robot 200 are communicated directly between the controllers 104 and 202 in addition to general signals, thereby realizing cooperative work by the machining center 100 and the robot 200.

Patent Document 1: Japanese Unexamined Patent Application, Publication No. 2010-64158

SUMMARY OF THE INVENTION

The open/close information about the doors at the machine tool and the open/close information about the safety gate at the auxiliary device are one type of information relating largely to safety operation of the machining cell. The machining system uses these pieces of information for determining whether the machine tool and the auxiliary device are in an operable state (this state can also be called a safe state) or an inoperable state (this state can also be called an unsafe state).

As shown in FIG. 22A, if only the side door 103 at the machining center 100 is open, for example, a worker is prohibited from accessing both the machining center 100 and the robot 200. Hence, the machining system determines that the worker is free from the risk of being exposed to danger and the machining center 100 and the robot 200 are in an operable state in which the machining center 100 and the robot 200 can be operated without a problem.

By contrast, if both the side door 103 at the machining center 100 and the safety gate 201 at the robot 200 are open while the front door 102 at the machining center 100 is closed as shown in FIG. 22B, the worker may interfere with the robot 200 to be subjected to the risk of being exposed to danger. As shown in FIG. 22C, if both the front door 102 and the side door 103 at the machining center 100 are open while the safety gate 201 at the robot 200 is closed, the worker is subjected to the risk of being exposed to danger if the worker contacts a hazardous object inside the machining center 100 or if chips or a cutting fluid scatters outwardly. Hence, the machining system determines that all these states are to cause problems in terms of safety of the worker.

In such cases, the controllers 104 and 202 communicate with each other directly to transfer information about the controllers 104 and 202 themselves. By doing so, the controller 104 determines that the machining center 100 is inoperable and executes control to stop the machining center 100. The controller 202 determines that the robot 200 is inoperable and executes control to stop the robot 200.

The foregoing conventional machining system is merely configured in such a manner that the controllers communicate with each other directly to determine individually whether a device to which each of the controllers belongs is operable or inoperable. Hence, the conventional machining system has failed to observe whether the machine tool and the auxiliary device are operable or inoperable in a unified manner. Hence, it has been difficult to say that the conventional machining system is capable of determining promptly and efficiently whether the machine tool and the auxiliary device are operable or inoperable.

The present invention is intended to provide a machining system capable of determining promptly and efficiently whether a machine tool and an auxiliary device are operable or inoperable.

(1) A machining system according to the present invention is a machining system (machining system 1 described later, for example) comprising a machine tool (machining center 2 described later, for example), a machine tool controller (numerical controller 21 described later, for example) that controls the machine tool, an auxiliary device (robot 3 described later, for example) that assists the machine tool, and an auxiliary device controller (robot controller 31 described later, for example) that controls the auxiliary device. The machine tool and the auxiliary device work cooperatively for machining. The machining system comprises a signal management unit (signal management unit 4 described later, for example) that receives a first signal and a second signal. The first signal indicates information (front door information S2a, side door information S2b described later, for example) about the machine tool as a criterion used for determining whether the machine tool and the auxiliary device are operable or inoperable. The second signal indicates information (safety gate information S3 described later, for example) about the auxiliary device as a criterion used for determining whether the machine tool and the auxiliary device are operable or inoperable. The signal management unit outputs a third signal indicating an operable state or an inoperable state of the machine tool and the auxiliary device to the machine tool controller and the auxiliary device controller based on the first signal and the second signal.

(2) In the machining system described in (1), the machine tool may have an openable/closable door, the auxiliary device may have an openable/closable safety gate and/or an area sensor, the information about the machine tool may be information about an open/closed state of the door, and the information about the auxiliary device may be information about an open/closed state of the safety gate and/or information about detection or non-detection by the area sensor.

(3) In the machining system described in (1) or (2), the signal management unit may be divided into a first region (first region 41 described later, for example) in which the first signal is received and a second region (second region 42 described later, for example) in which the second signal is received, the first region of the signal management unit may receive power supply from the machine tool, and the second region of the signal management unit may receive power supply from the auxiliary device.

(4) In the machining system described in (1) or (2), the signal management unit may be operated by power supply (power supply 22 described later, for example) from the machine tool, by power supply (power supply 32 described later, for example) from the auxiliary device, or by power supply (power supply 5 described later, for example) independent of the machine tool and the auxiliary device.

(5) In the machining system described in any one of (1) to (4), the signal management unit may be provided at the machine tool or the auxiliary device, or independently of the machine tool and the auxiliary device.

A machining system provided by the present invention is capable of determining promptly and efficiently whether a machine tool and an auxiliary device are operable or inoperable.

BRIEF DESCRIPTION OF THE DRAWINGS

FIG. 3 shows an exemplary relationship between a combination of an open state or a closed state indicated by each of front door information, side door information, and safety gate information, and operability or inoperability of a machining center and a robot corresponding to the combination;

DETAILED DESCRIPTION OF THE INVENTION

Figure 1:
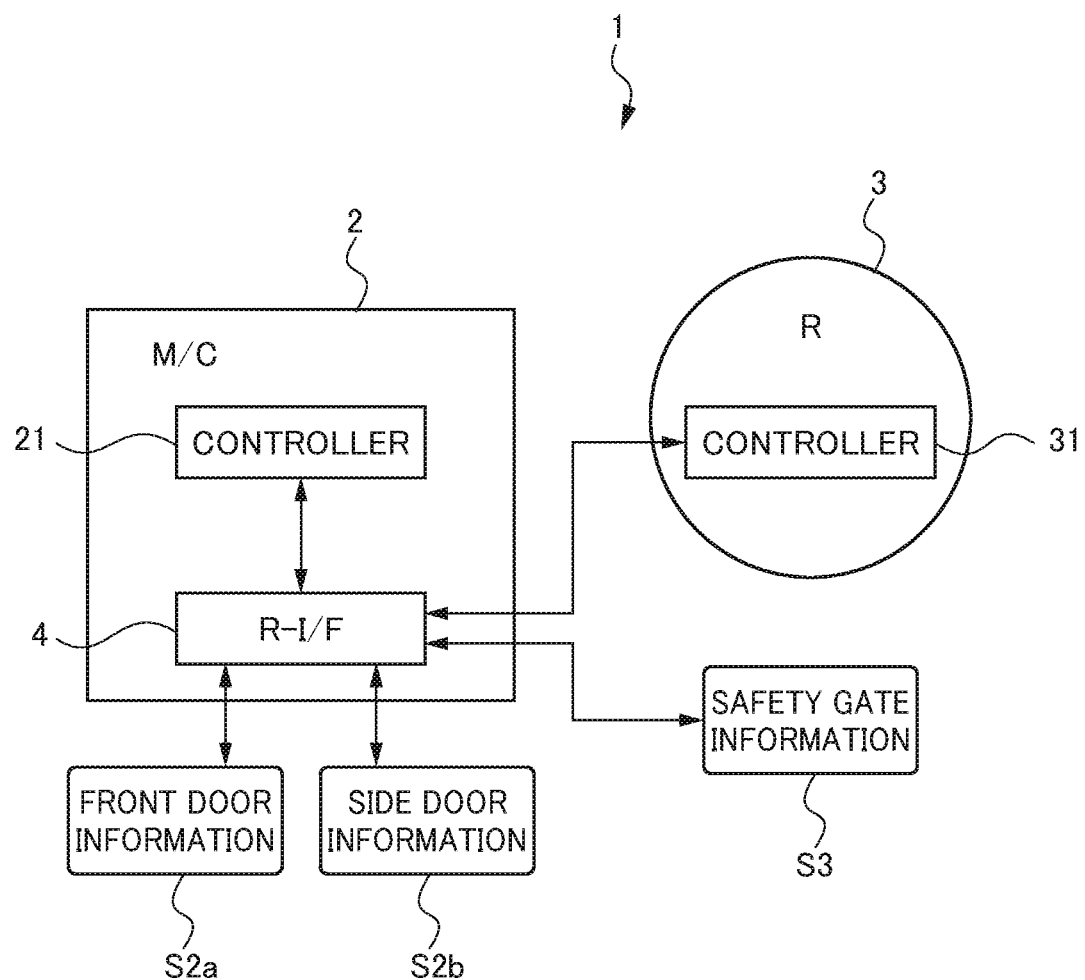
FIG. 1 is a block diagram showing the configuration of a machining system according to a first embodiment of the present invention.

Embodiments of the present invention will be described below. FIG. 1 is a block diagram showing the configuration of a machining system according to a first embodiment of the present invention. A machining system 1 includes a machining center 2 and a robot 3. The machining center 2 and the robot 3 constitute one machining cell.

The machining center 2 is a numerically-controlled machine tool that performs various types of machining or work on a machining target. The machining center 2 is an example of a machine tool according to the present invention.

Figure 20:
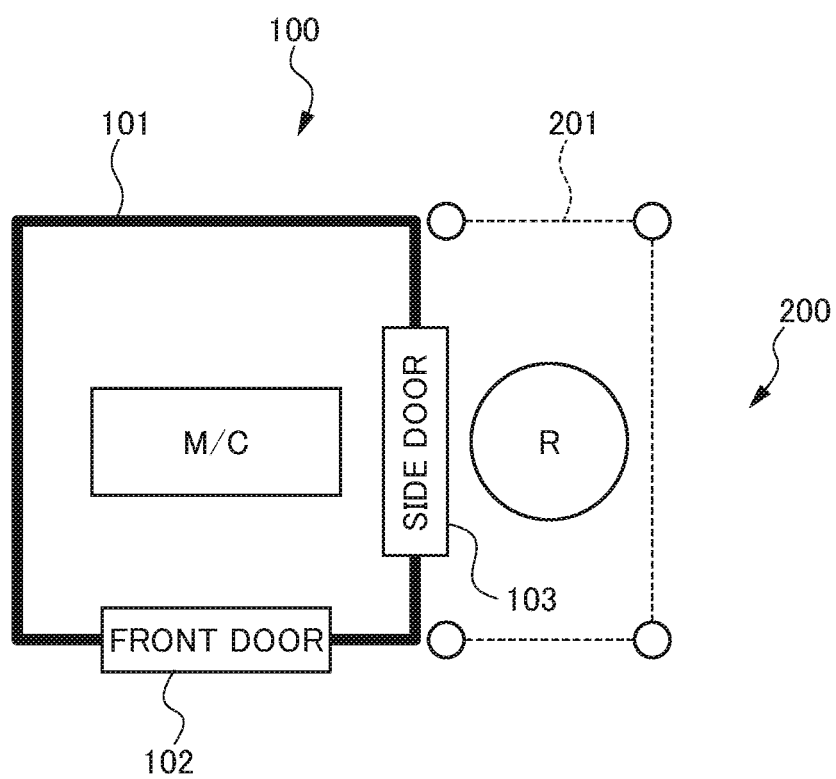
FIG. 20 is a schematic view showing an exemplary configuration of a conventional machining system.
Figure 21:
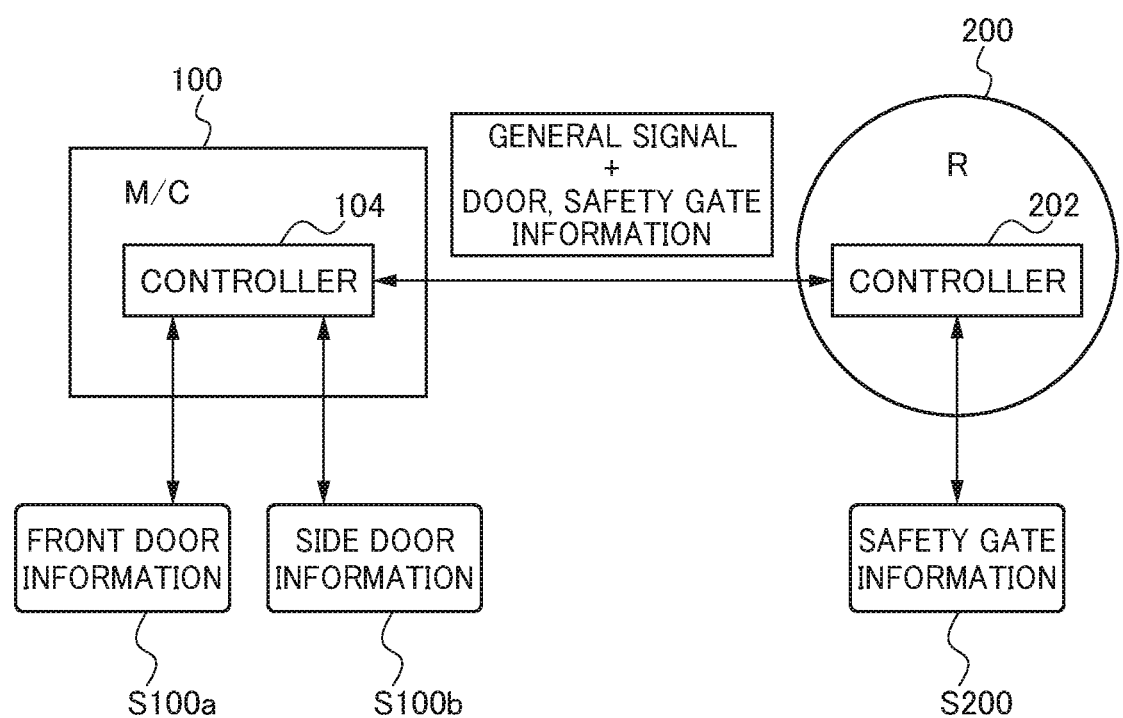
FIG. 21 is a block diagram showing a conventional relationship between a machine tool and an auxiliary device.
Figure 22A:
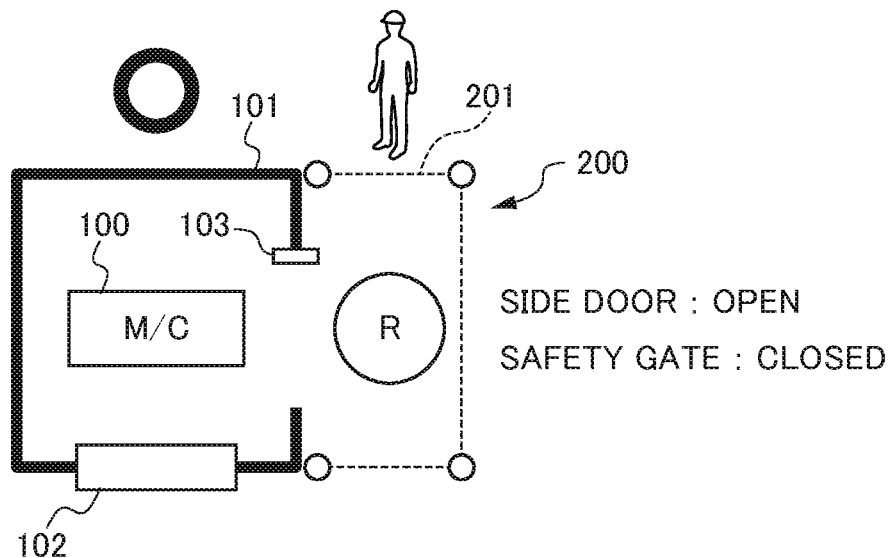
FIG. 22A explains a relationship between the machine tool, a robot, and safety of a worker.
Figure 22B:
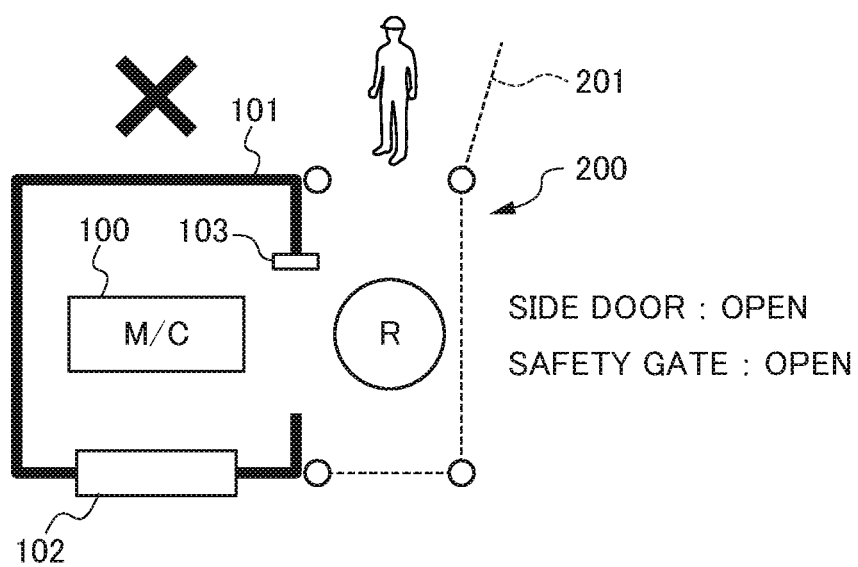
FIG. 22B explains a relationship between the machine tool, the robot, and safety of the worker.
Figure 22C:
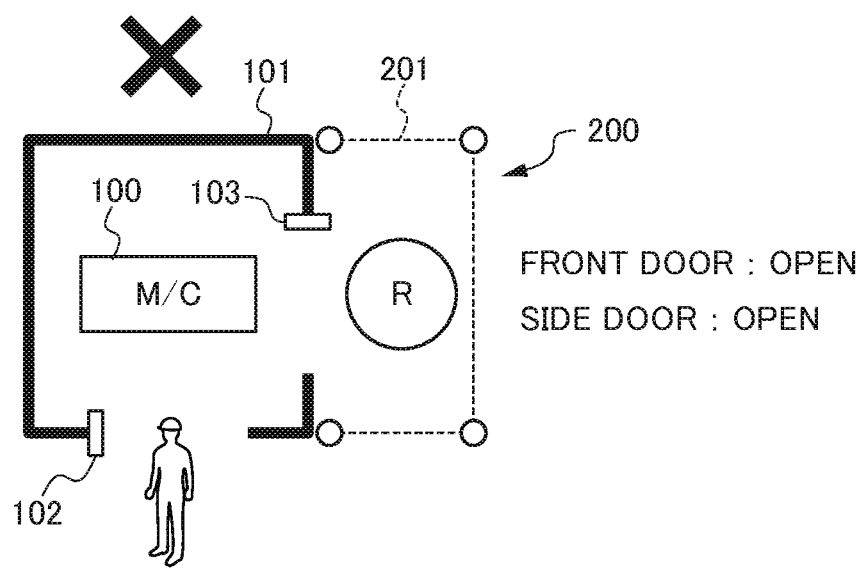
FIG. 22C explains a relationship between the machine tool, the robot, and safety of the worker.

The machining center 2 includes a numerical controller 21 (machine tool controller according to the present invention) that controls the operation, etc. of the machining center 2. The machining center 2 has openable/closable doors (a front door and a side door not shown in FIG. 1) similar to the doors (front door 102 and side door 103) shown in FIG. 20. The front door is a door for a worker to access the interior of a housing of the machining center 2 (hereinafter simply called interior). The side door is a working door for the robot 3 to access the interior of the machining center 2.

The foregoing front door and side door have a front door sensor and a side door sensor respectively (both of which are not shown in the drawings) for detecting an open/closed state. The front door sensor and the side door sensor output a signal (first signal according to the present invention) indicating information about an open/closed state of the front door (front door information S2a), and a signal (first signal according to the present invention) indicating information about an open/closed state of the side door (side door information S2b) respectively. These signals may be signals as they are output from the corresponding sensors or may be signals passed through an electromagnetic relay, for example. The front door information S2a and the side door information S2b are information as criteria used for determining whether the machining center 2 and the robot 3 are operable or inoperable, and information about the machining center 2.

The robot 3 includes an articulated robot with a robot hand, for example. The robot 3 is a transfer device that works cooperatively with the operation of the machining center 2 to transfer a machining target into the machining center 2 and transfer the machining target machined or manufactured at the machining center 2 out of the machining center 2. The robot 3 is an example of an auxiliary device according to the present invention.

The robot 3 includes a robot controller 31 (auxiliary device controller according to the present invention) that controls the operation of the robot 3, etc. The robot 3 has a safety gate (not shown in the drawings) provided around the robot 3 and similar to the openable/closable safety gate 201 shown in FIG. 20. The safety gate is a gate provided to separate a path for access to the robot 3 by a worker and the periphery of the robot 3.

The safety gate has a safety gate sensor (not shown in the drawings) for detecting an open/closed state. The safety gate sensor outputs a signal (second signal according to the present invention) indicating information about an open/closed state (safety gate information S3). The safety gate information S3 is information as a criterion used for determining whether the machining center 2 and the robot 3 are operable or inoperable, and information about the robot 3.

In this embodiment, one signal management unit 4 is arranged at the machining center 2. The signal management unit 4 functions as a third controller including an interface for receiving a signal indicating each of the front door information S2a and the side door information S2b, and a signal indicating the safety gate information S3 transferred between the machining center 2 and the robot 3.

The signal management unit 4 aggregates a signal indicating each of the front door information S2a and the side door information S2b and a signal indicating the safety gate information S3, and monitors the aggregated signals in a unified manner. Based on these signals, the signal management unit 4 outputs a signal (third signal according to the present invention) indicating an operable state or an inoperable state of the machining center 2 and the robot 3 determined by a combination of these signals to the numerical controller 21 and the robot controller 31.

Figure 2A:
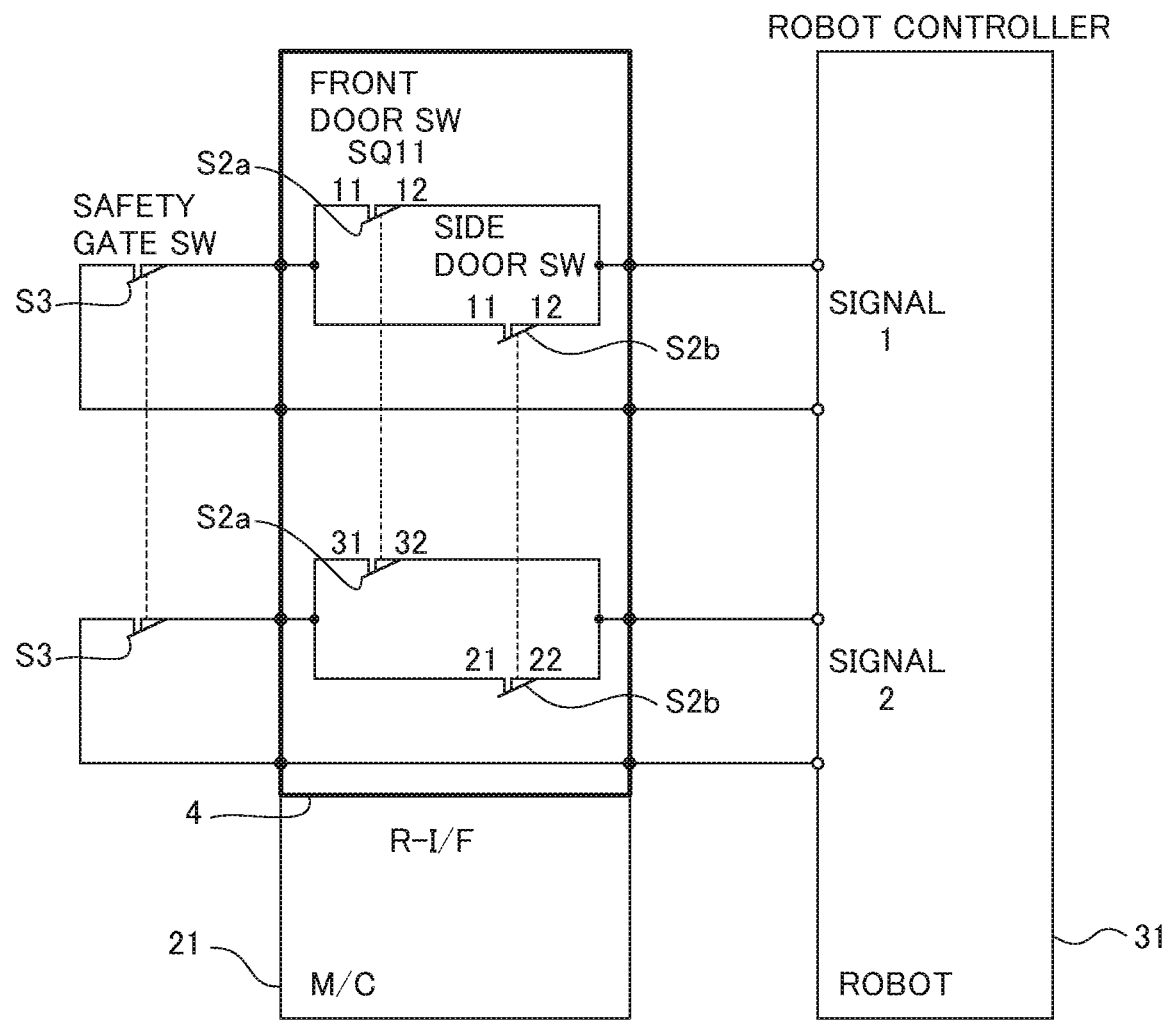
FIG. 2A shows an exemplary specific configuration of a signal management unit.
Figure 2B:
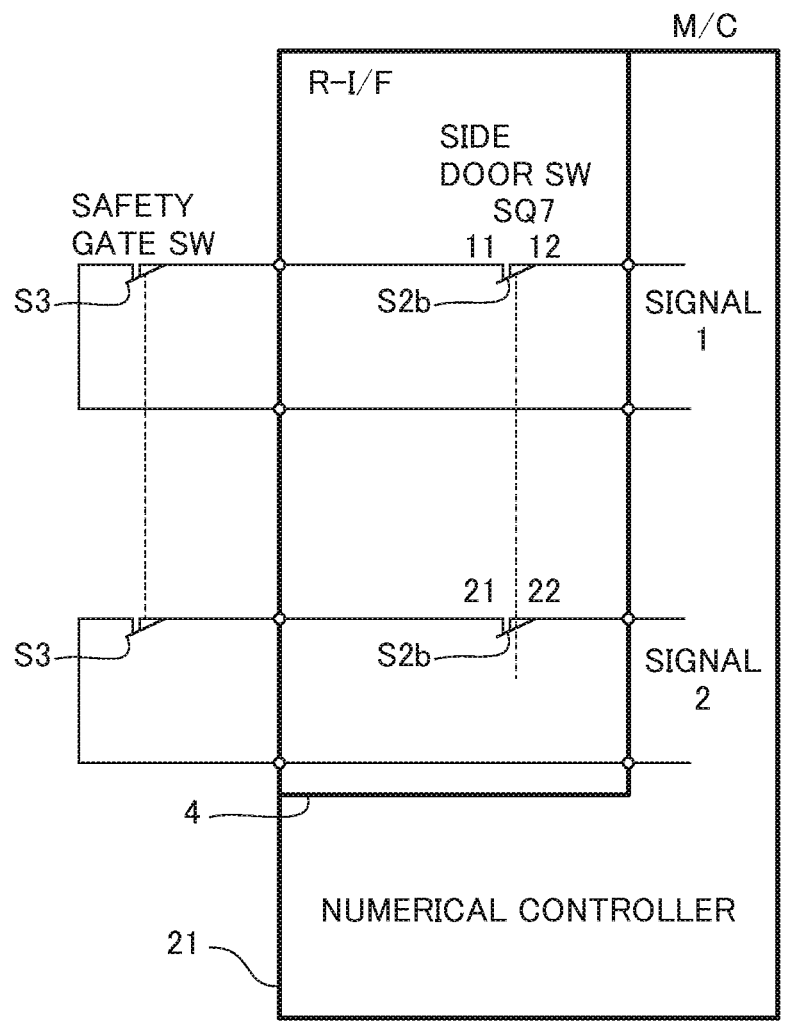
FIG. 2B shows an exemplary specific configuration of the signal management unit.

FIGS. 2A and 2B each show an exemplary specific configuration of the signal management unit 4. In these examples, the signal management unit 4 is formed using a sequence circuit with multiple relays. FIG. 2A shows an example where a signal indicating each of the front door information S2a and the side door information S2b about the machining center 2 is combined with the safety gate information S3 about the robot 3, and a signal as the third signal indicating an operable state or an inoperable state is output to the robot controller 31. If the signals indicating the front door information S2a, the side door information S2b, and the safety gate information S3 are input to the relays respectively forming the signal management unit 4, the signal management unit 4 outputs a signal indicating an operable state or an inoperable state of the machining center 2 and the robot 3 to each of the numerical controller 21 and the robot controller 31 in response to a combination of an open state or a closed state indicated by each of the front door information S2a, the side door information S2b, and the safety gate information S3.

FIG. 2B shows an example where a signal indicating the safety gate information S3 about the robot 3 is combined with the side door information S2b about the machining center 2, and a signal as the third signal indicating an operable state or an inoperable state is output to the numerical controller 21. If the signals indicating the safety gate information S3 and the side door information S2b are input to the relays forming the signal management unit 4, the signal management unit 4 outputs a signal indicating an operable state or an inoperable state of the machining center 2 and the robot 3 to the numerical controller 21 in response to a combination of an open state or a closed state indicated by each of the safety gate information S3 and the side door information S2b.

To ensure safety, the signal management unit 4 shown in FIGS. 2A and 2B doubles a signal to produce a signal 1 and a signal 2 and processes the signals 1 and 2. A signal output from the signal management unit 4 such as that shown in FIGS. 2A and 2B is an ON signal (with a signal) or an OFF signal (without a signal). Thus, an operable state can be indicated by output of an ON signal and an inoperable state can be indicated by output of an OFF signal, for example.

FIG. 3 shows an exemplary relationship between a combination of an open state or a closed state indicated by each of the front door information S2a, the side door information S2b, and the safety gate information S3, and operability or inoperability of the machining center 2 and the robot 3 corresponding to the combination. As shown in FIG. 3, if all the front door and the side door at the machining center 2 and the safety gate at the robot 3 are closed, and if only the side door at the machining center 2 is open, for example, it is determined that a worker is free from the risk of being exposed to danger and both the machining center 2 and the robot 3 are in an operable state.

Then, the signal management unit 4 outputs a signal indicating that the machining center 2 and the robot 3 are in an operable state to the numerical controller 21 and the robot controller 31. After receiving this signal, the numerical controller 21 and the robot controller 31 execute control to start or continue operations of the machining center 2 and the robot 3. The numerical controller 21 and the robot controller 31 may alternatively execute control to give an indication showing that the machining center 2 and the robot 3 are in an operable state (indication on a monitor screen or lighting of a lamp, for example), and wait instruction from a worker to start operation.

If only the safety gate at the robot 3 is open, the worker is subjected to the risk of being exposed to danger by the operation of the robot 3. In this case, only the robot 3 is determined to be inoperable. Then, the signal management unit 4 outputs a signal indicating that the robot 3 is in an inoperable state to the robot controller 31. After receiving this signal, the robot controller 31 executes control to prohibit start of the operation of the robot 3 or stop the operation of the robot 3. At the same time, a warning indicating that the robot 3 is in an inoperable state may be issued (indication of a warning on a monitor screen, lighting of a warning lamp, or issuance of an alarm, for example).

If only the front door at the machining center 2 is open, the worker is subjected to the risk of being exposed to danger by the operation of the machining center 2. In this case, only the machining center 2 is determined to be inoperable. Then, the signal management unit 4 outputs a signal indicating that the machining center 2 is in an inoperable state to the numerical controller 21. After receiving this signal, the numerical controller 21 executes control to prohibit start of the operation of the machining center 2 or stop the operation of the machining center 2. At the same time, a warning indicating that the machining center 2 is in an inoperable state may be issued (indication of a warning on a monitor screen, lighting of a warning lamp, or issuance of an alarm, for example).

In the other cases, both the machining center 2 and the robot 3 are determined to be inoperable. Then, the signal management unit 4 outputs a signal indicating that both the machining center 2 and the robot 3 are in an inoperable state to the numerical controller 21 and the robot controller 31. After receiving this signal, the numerical controller 21 and the robot controller 31 execute control to prohibit start of the operations of the machining center 2 and the robot 3 or stop the operations of the machining center 2 and the robot 3 respectively. At the same time, a warning indicating that the machining center 2 and the robot 3 are in an inoperable state may be issued (indication of a warning on a monitor screen, lighting of a warning lamp, or issuance of an alarm, for example).

As described above, in the machining system 1 according to the present invention, the signal management unit 4 functioning as a third controller aggregates information as criteria used for determining whether the machining center 2 and the robot 3 are operable or inoperable, and monitors the aggregated information in a unified manner. Based on the aggregated information, the machining system 1 outputs a signal indicating that one or both of the machining center 2 and the robot 3 are in an operable state or a signal indicating that one or both of the machining center 2 and the robot 3 are in an inoperable state to the numerical controller 21 and the robot controller 31. This eliminates the need to communicate information about operability or inoperability directly between the controllers 21 and 31. This further eliminates the need for each of the controllers 21 and 31 to make a determination about operability or inoperability. As a result, the machining system 1 according to the present invention becomes capable of determining operability or inoperability of the machining center 2 and the robot 3 more promptly and more efficiently than the conventional machining system.

As long as the signal management unit 4 has a function comparable to the foregoing function, the signal management unit 4 is not limited to a sequence circuit with multiple relays but may be configured in various ways. For example, the signal management unit 4 may be configured using a programmable logic controller (PLC), a microprocessor, a personal computer (PC), for example. If the signal management unit 4 having such configurations is used, the signal management unit 4 is allowed to hold a data table in advance such as that shown in FIG. 3 defining a relationship between information about an open/closed state and operability or inoperability. In this case, the signal management unit 4 may determine operability or inoperability of each of the machining center 2 and the robot 3 and output a signal indicating an operable state or an inoperable state by referring to information aggregated by the signal management unit 4 and the data table. Signals aggregated by the signal management unit 4 may be some of signals for determining an operation state. If necessary, other signals may be communicated between the controllers 21 and 31 at the machining center 2 and the robot 3 respectively.

Figure 4:
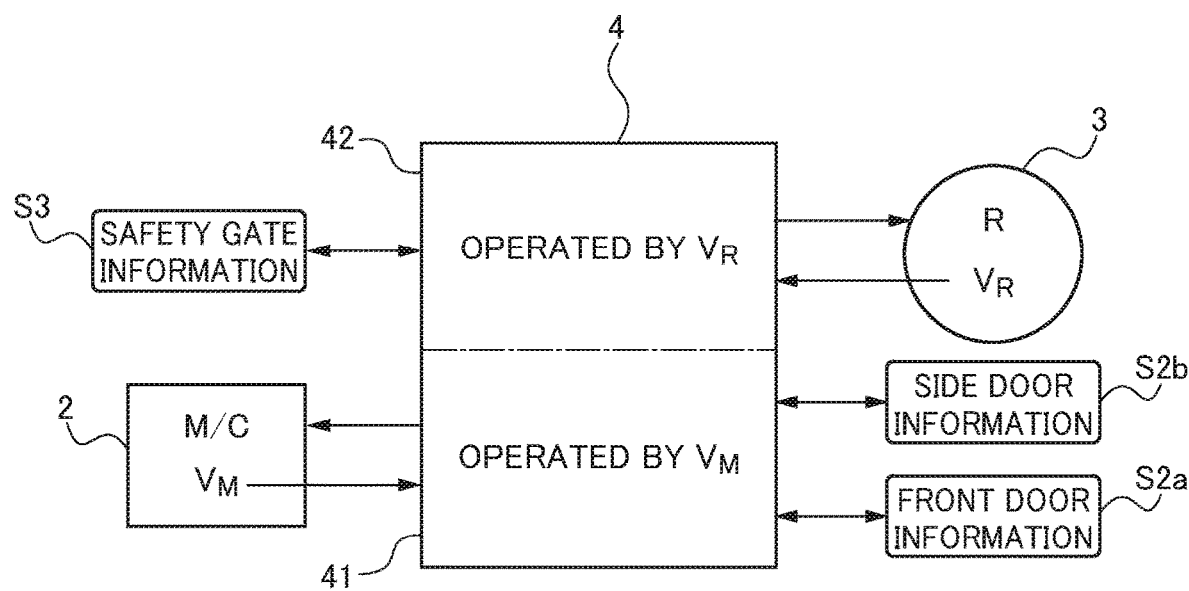
FIG. 4 is a conceptual view showing a first example of the configuration of the signal management unit that receives both power supply from the machining center and power supply from the robot.

The signal management unit 4 may be configured to be operated by both power supply from the machining center 2 and power supply from the robot 3. FIG. 4 is a conceptual view showing a first example of the configuration of the signal management unit 4 that receives both power supply from the machining center 2 and power supply from the robot 3. In the first example, the signal management unit 4 is divided into a first region 41 in which signals indicating the front door information S2a and the side door information S2b about the machining center 2 are received and a second region 42 in which a signal indicating the safety gate information S3 about the robot 3 is received. The first region 41 is a region to be operated by power supply ($V_M$) from the machining center 2. The second region 42 is a region to be operated by power supply ($V_R$) from the robot 3. In this case, the signal management unit 4 can reduce power supply load on the machining center 2 or the robot 3, compared to a case where only one of the machining center 2 and the robot 3 supplies power to the signal management unit 4.

The foregoing signal management unit 4 divided into the first region 41 and the second region 42 may have switching means. In case of abnormality such as shut down occurring at the power supply at the machining center 2 or the robot 3, the switching means makes a switch in such a manner that power from the other of the machining center 2 and the robot 3 is supplied to both the first region 41 and the second region 42. By doing so, even if abnormality occurs at the power supply at the machining center 2 or the robot 3, the signal management unit 4 can still be operated reliability to ensure safety of a worker. The detail of the switching means is not particularly limited. Well-known switching means is applicable. A switch may be made automatically or manually by the worker using a short cable, for example.

Figure 5:
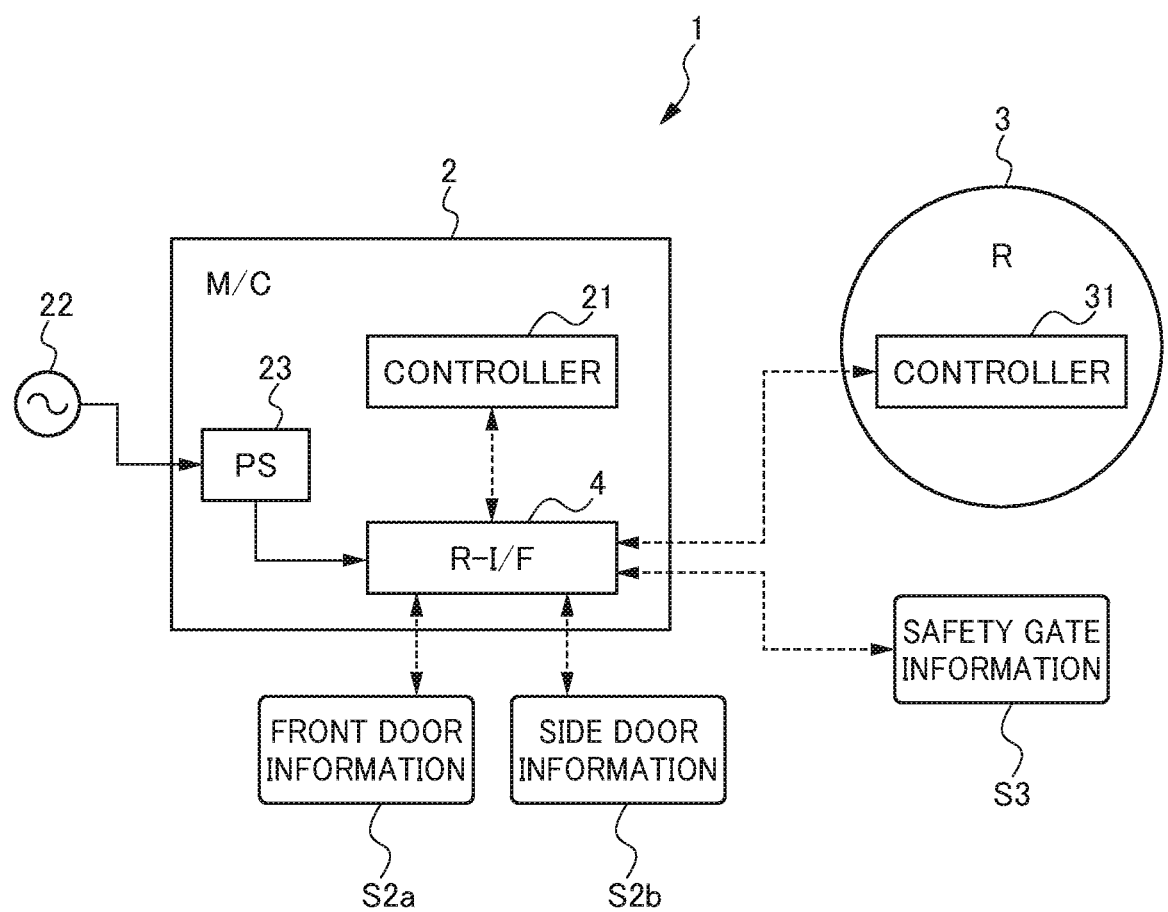
FIG. 5 is a block diagram of the machining system showing a second example of the configuration of the signal management unit that receives power supply for operating the machining center.

Power supply for operating the signal management unit 4 may be different from the power supply at at least one of the machining center 2 and the robot 3. In this case, the machining system has configurations according to a second example, a third example, and a fourth example shown in the block diagrams in FIGS. 5 to 7 respectively. FIG. 5 is a block diagram of the machining system 1 showing the second example of the configuration of the signal management unit 4 that receives power supply for operating the machining center 2. A sign 22 in FIG. 5 shows power supply for operating the machining center 2. A sign 23 in FIG. 5 shows a power supply unit for distributing power supply to each unit in the machining center 2. Even if abnormality occurs at power supply at the robot 3, the machining system 1 shown in FIG. 5 can still operate the signal management unit 4. Thus, this machining system 1 is applicable to a case where priority is intended to be given to ensuring safety of a worker against the machining center 2, for example.

Figure 6:
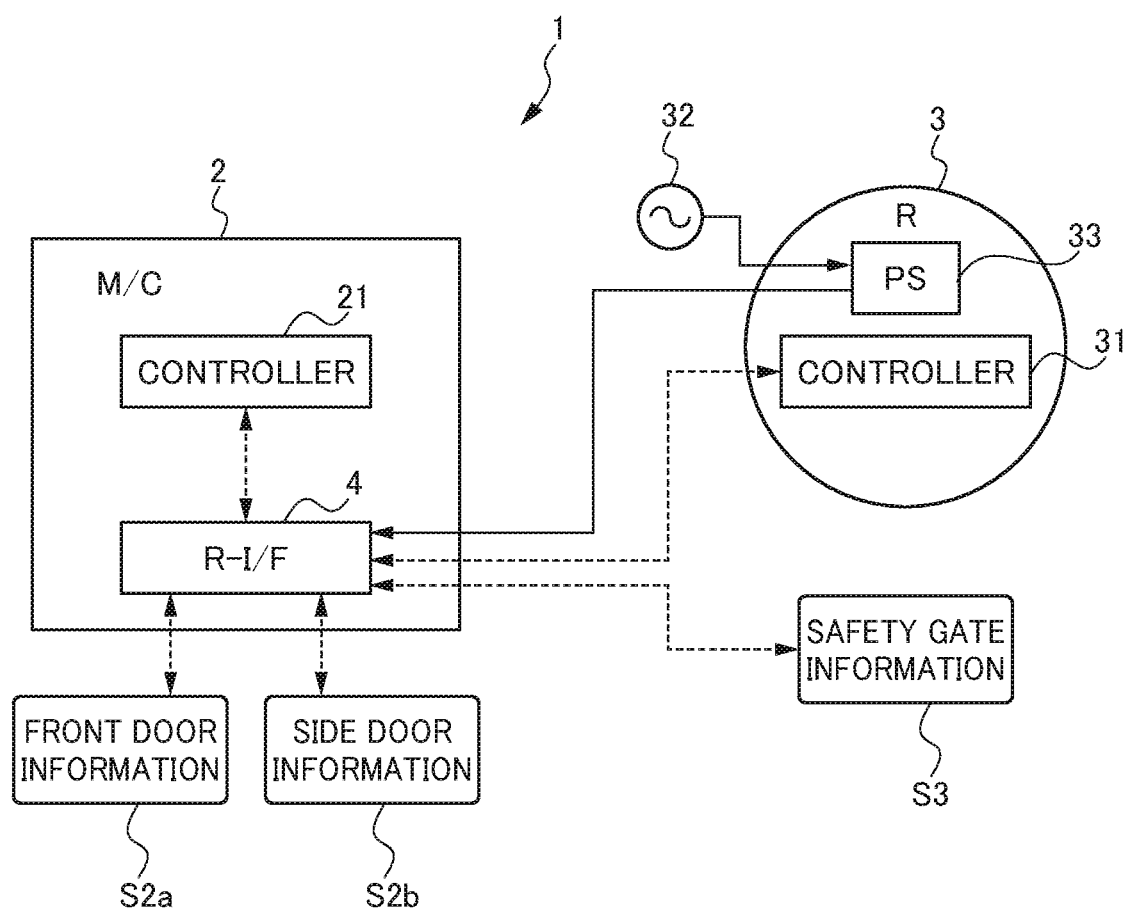
FIG. 6 is a block diagram of the machining system showing a third example of the configuration of the signal management unit that receives power supply for operating the robot.

FIG. 6 is a block diagram of the machining system 1 showing the third example of the configuration of the signal management unit 4 that receives power supply for operating the robot 3. A sign 32 in FIG. 6 shows power supply for operating the robot 3. A sign 33 in FIG. 6 shows a power supply unit for distributing power supply to each unit in the robot 3. Even if abnormality occurs at power supply at the machining center 2, the machining system 1 shown in FIG. 6 can still operate the signal management unit 4. Thus, this machining system 1 is applicable to a case where priority is intended to be given to ensuring safety of a worker against the robot 3, for example.

Figure 7:
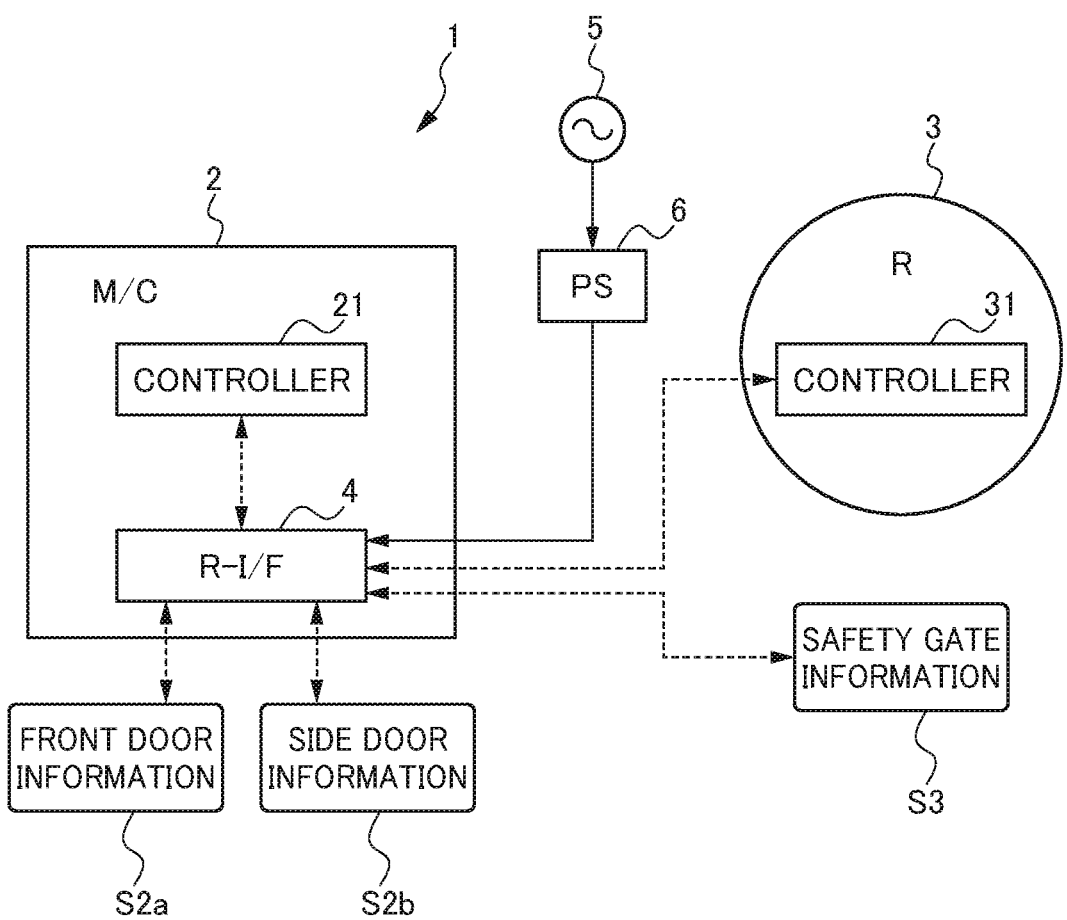
FIG. 7 is a block diagram of the machining system showing a fourth example of the configuration of the signal management unit that receives independent power supply different from both the power supply for the machining center and the power supply for the robot.

FIG. 7 is a block diagram of the machining system 1 showing the fourth example of the configuration of the signal management unit 4 that receives independent power supply different from both power supply at the machining center 2 and power supply at the robot 3. A sign 5 in FIG. 7 shows power supply independent of the machining center 2 and the robot 3. A sign 6 in FIG. 7 shows a power supply unit independent of the machining center 2 and the robot 3. Even if abnormality occurs at both the power supply at the machining center 2 and the power supply at the robot 3, the machining system 1 shown in FIG. 7 can still operate the signal management unit 4. Thus, this machining system 1 can ensure safety of a worker more reliably.

Figure 8:
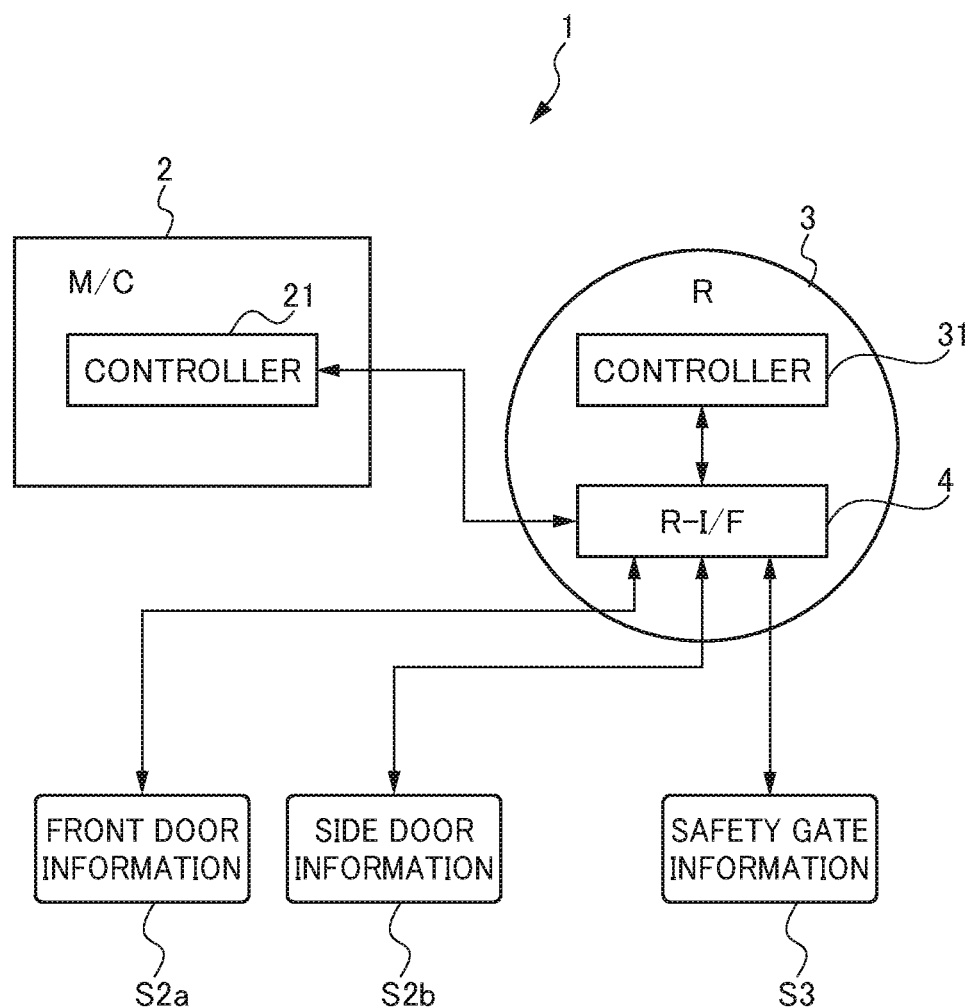
FIG. 8 is a block diagram showing the configuration of a machining system according to a second embodiment of the present invention.
Figure 9:
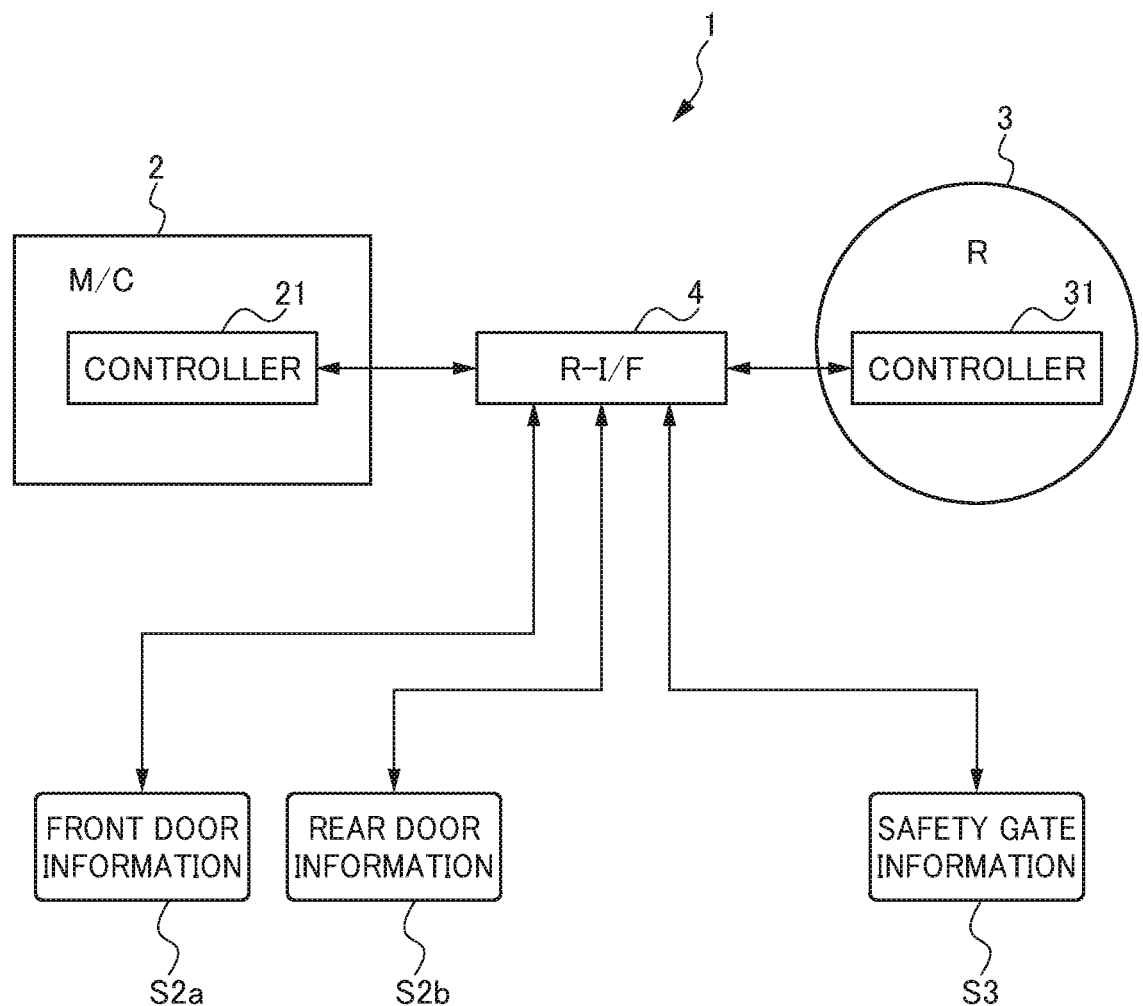
FIG. 9 is a block diagram showing the configuration of a machining system according to a third embodiment of the present invention.

The signal management unit 4 according to the first embodiment shown in FIG. 1 and FIGS. 5 to 7 is arranged at the machining center 2. However, this is not the only case. The signal management unit 4 may be arranged at a place other than the machining center 2, as shown in FIGS. 8 and 9. FIG. 8 is a block diagram showing the configuration of a machining system 1 according to a second embodiment of the present invention. The signal management unit 4 according to the second embodiment is arranged at the robot 3. FIG. 9 is a block diagram showing the configuration of a machining system 1 according to a third embodiment of the present invention. The signal management unit 4 according to the third embodiment is arranged independently of both the machining center 2 and the robot 3.

As described above by referring to FIG. 4, the signal management unit 4 according to each of the second embodiment and the third embodiment shown in FIGS. 8 and 9 may be configured to be operated by both power supply from the machining center 2 and power supply from the robot 3. Alternatively, as described above by referring to FIGS. 5 and 6, the signal management unit 4 according to each of the second embodiment and the third embodiment may be configured to be operated by power supply from one of the machining center 2 and the robot 3. Still alternatively, as described above by referring to FIG. 7, the signal management unit 4 according to each of the second embodiment and the third embodiment may be configured to be operated by independent power supply different from both the power supply at the machining center 2 and the power supply at the robot 3.

The number of the machining centers 2 and that of the robots 3 in one machining system 1 are not limited to one. As shown in FIGS. 10 to 14, for example, at least one machining center 2 and at least one robot 3 may be provided. In this case, one signal management unit 4 becomes capable of aggregating signals about multiple machining centers 2 and signals about multiple robots 3 and monitoring the aggregated signals collectively.

Figure 10:
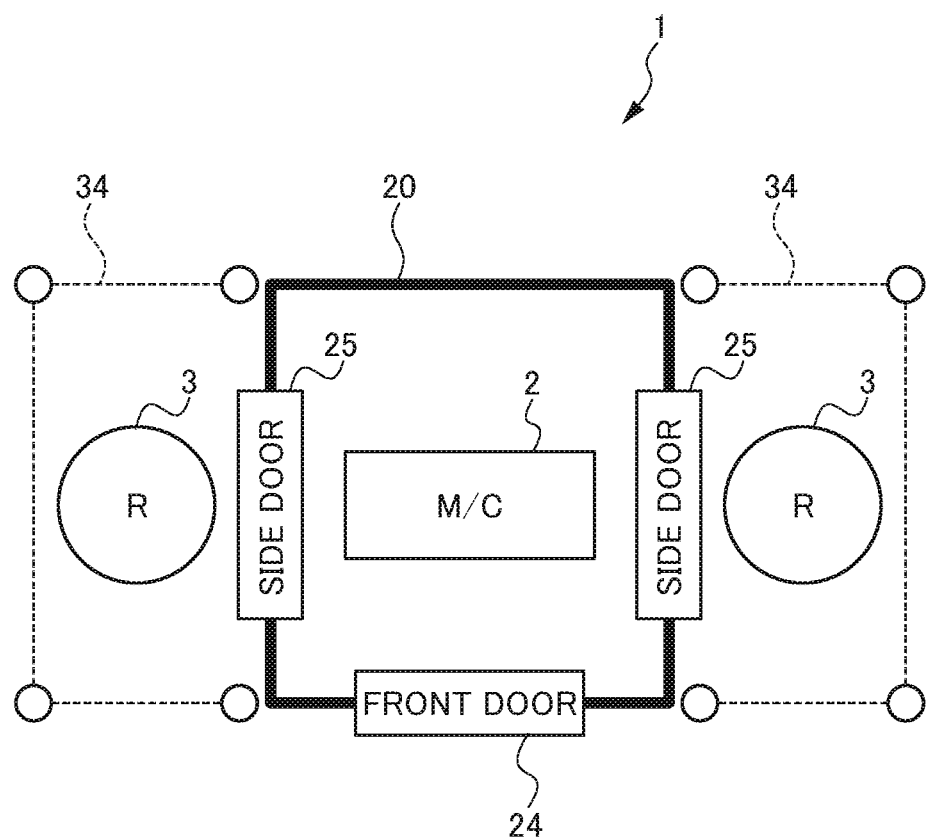
FIG. 10 is a schematic view showing the configuration of a machining system according to a fourth embodiment of the present invention.
Figure 11:
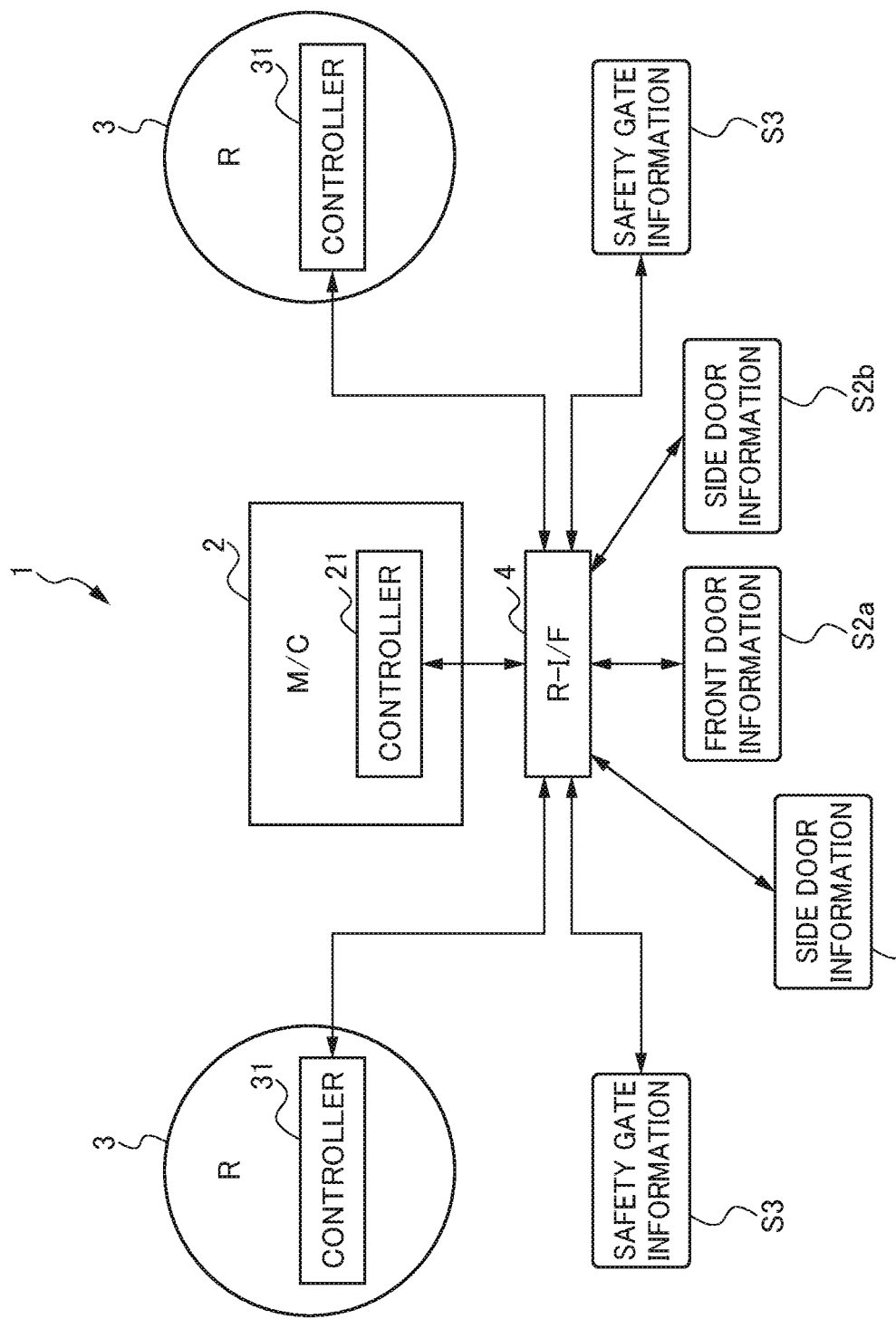
FIG. 11 is a block diagram showing the configuration of the machining system shown in FIG. 10.

FIG. 10 is a schematic view showing the configuration of a machining system 1 according to a fourth embodiment of the present invention. FIG. 11 is a block diagram showing the configuration of the machining system 1 shown in FIG. 10. The machining system 1 according to the fourth embodiment includes one machining center 2 and two robots 3, 3. The two robots 3, 3 and the machining center 2 are arranged in such a manner that the machining center 2 is caught between the robots 3, 3 from opposite sides of the machining center 2. The machining center 2 has a housing 20, and one front door 24 and two side doors 25, 25 for the corresponding robots 3, 3 arranged at the housing 20. The two robots 3, 3 have corresponding safety gates 34, 34 provided around the robots 3, 3.

As shown in FIG. 11, in the machining system 1 according to the fourth embodiment, one signal management unit 4 can receive signals indicating front door information S2a and side door information S2b, S2b about one machining center 2 and signals indicating safety gate information S3, S3 about the two robots 3 collectively, and output a signal indicating an operable state or an inoperable state of the machining center 2 and the robots 3, 3 to the controllers 21 and 31, 31 at the machining center 2 and the robots 3, 3 respectively. This eliminates the need for the controllers 21 and 31, 31 to communicate information about operability or inoperability directly with each other. This further eliminates the need for each of the controllers 21 and 31, 31 to make a determination about operability or inoperability. In this way, with increase in the number of the machining centers 2 and that of the robots 3, the effect of promptly and efficiently determining operability or inoperability is achieved more notably.

Figure 12:
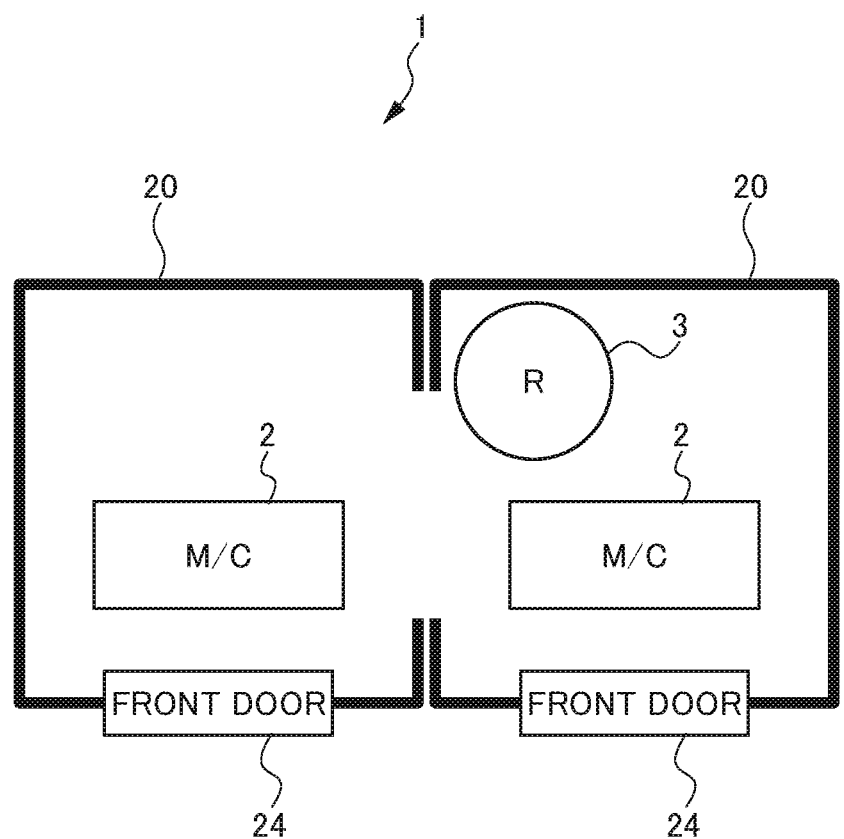
FIG. 12 is a schematic view showing the configuration of a machining system according to a fifth embodiment of the present invention.
Figure 13:
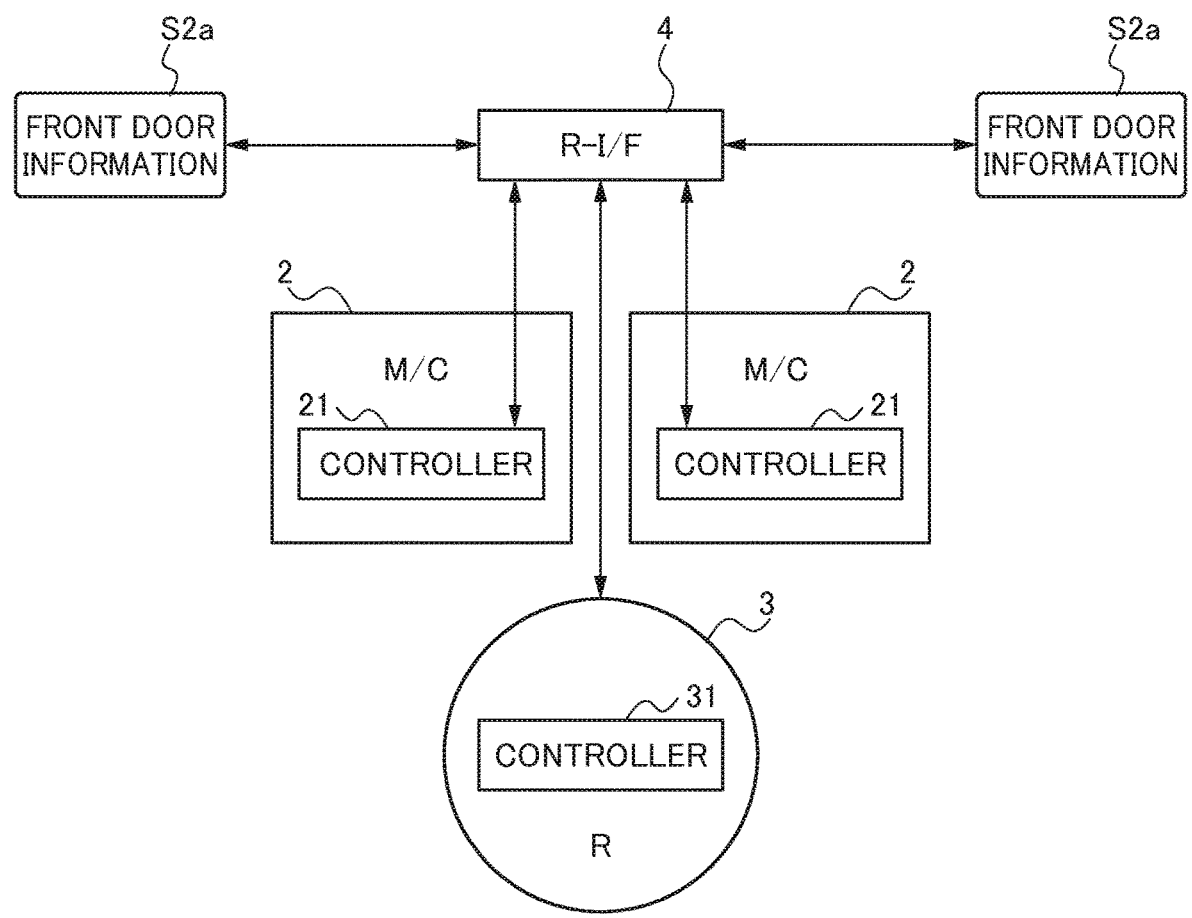
FIG. 13 is a block diagram showing the configuration of the machining system shown in FIG. 12.

FIG. 12 is a schematic view showing the configuration of a machining system 1 according to a fifth embodiment of the present invention. FIG. 13 is a block diagram showing the configuration of the machining system 1 shown in FIG. 12. The machining system 1 according to the fifth embodiment includes two machining centers 2, 2 and one robot 3. Housings 20, 20 of the corresponding two machining centers 2, 2 are connected. Each of the housings 20, 20 of the corresponding machining centers 2, 2 has one front door 24. One robot 3 is arranged inside the housing 20 of one of the machining centers 2. In this machining system 1, side doors at the machining centers 2, 2 and a safety gate at the robot 3 are not always required to be provided.

In the machining system 1 according to the fifth embodiment, one signal management unit 4 can receive signals indicating front door information S2a, S2a about the two machining centers 2, 2 collectively, and output a signal indicating an operable state or an inoperable state of the machining centers 2, 2 and the robot 3 to the controllers 21, 21 and 31 at the machining centers 2, 2 and the robot 3 respectively.

Figure 14:
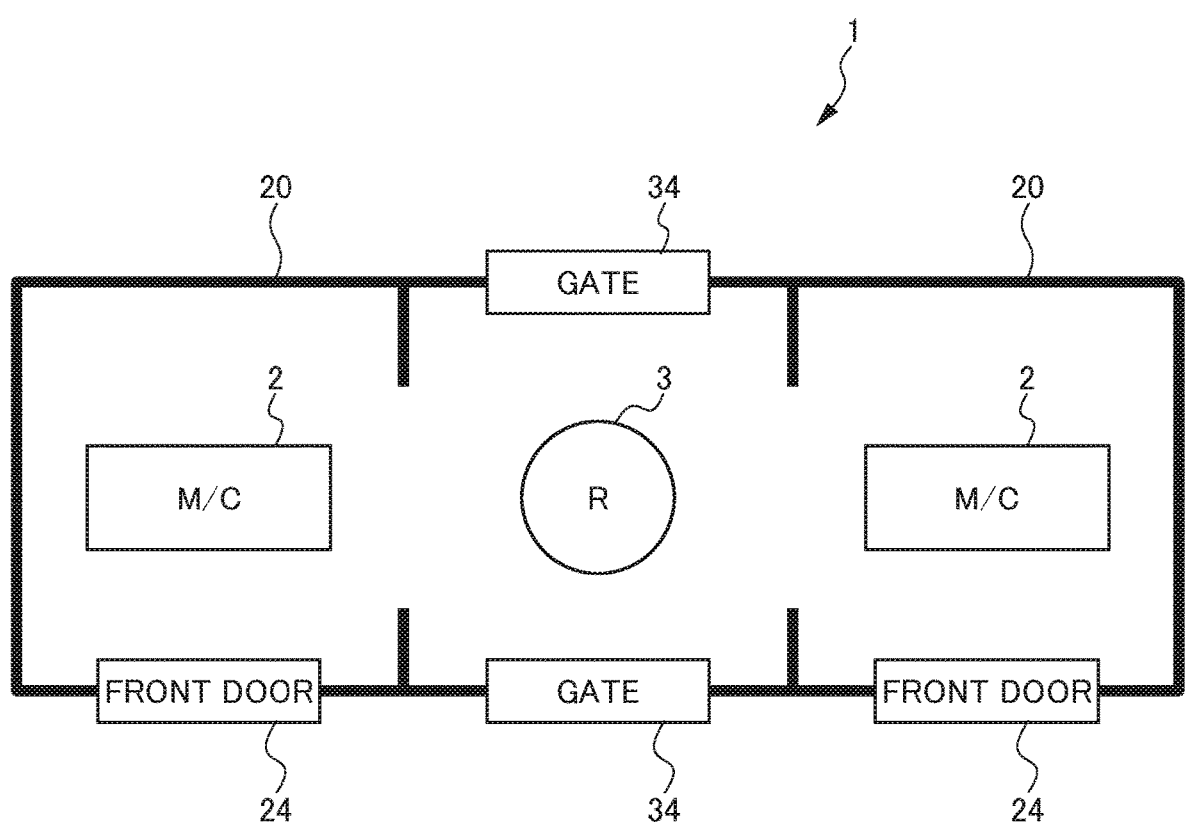
FIG. 14 is a schematic view showing the configuration of a machining system according to a sixth embodiment of the present invention.
Figure 15:
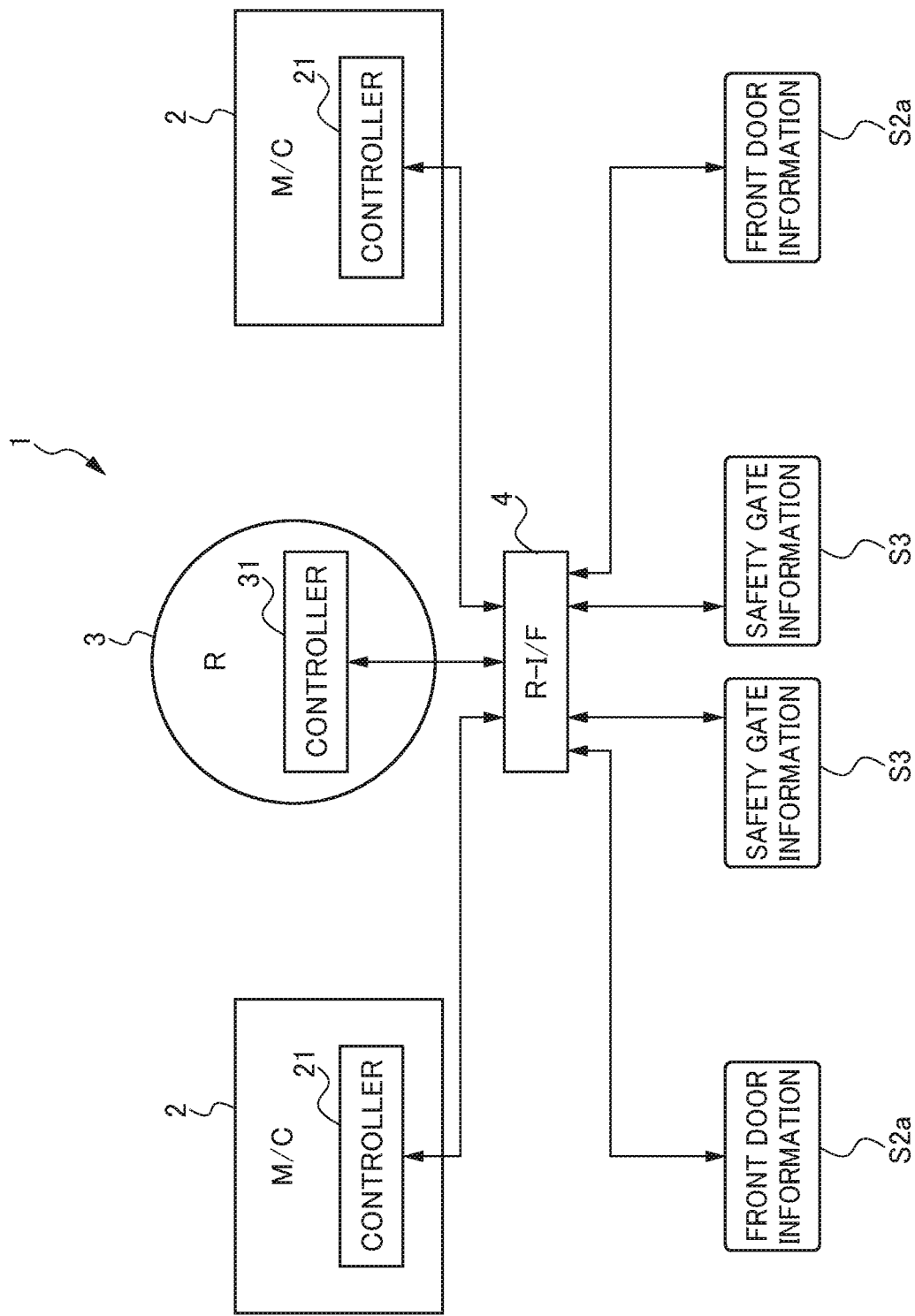
FIG. 15 is a block diagram showing the configuration of the machining system shown in FIG. 14.

FIG. 14 is a schematic view showing the configuration of a machining system 1 according to a sixth embodiment of the present invention. FIG. 15 is a block diagram showing the configuration of the machining system 1 shown in FIG. 14. The machining system 1 according to the sixth embodiment includes two machining centers 2, 2 and one robot 3. The two machining centers 2, 2 and one robot 3 are arranged in such a manner that the robot 3 is caught between the machining centers 2, 2 from opposite sides of the robot 3. Each of the housings 20, 20 of the corresponding machining centers 2, 2 has one front door 24. One robot 3 has safety gates 34, 34 provided around the robot 3. In this machining system 1, side doors at the machining centers 2, 2 are not always required to be provided.

In the machining system 1 according to the sixth embodiment, one signal management unit 4 can receive signals indicating front door information S2a, S2a about the two machining centers 2, 2 and signals indicating safety gate information S3, S3 about one robot 3 collectively, and output a signal indicating an operable or an inoperable state of the machining centers 2, 2 and the robot 3 to the respective controllers at the machining centers 2, 2 and the robot 3.

As described above, even if multiple machining centers 2 and/or multiple robots 3 are provided in one machining system 1, one signal management unit 4 can still aggregate all pieces of information and output a signal indicating an operable state or an inoperable state of the machining center 2 and the robot 3 to each of the controllers 21 and 31. This eliminates the need for the controllers 21 and 31 to communicate information about operability or inoperability directly with each other. This further eliminates the need for each of the controllers 21 and 31 to make a determination about operability or inoperability. In this way, with increase in the number of the machining centers 2 and that of the robots 3, the effect of promptly and efficiently determining operability or inoperability of the machining center 2 and the robot 3 is achieved more notably.

The signal management unit 4 shown in each of FIG. 11, FIG. 13, and FIG. 15 is arranged independently of both the machining center 2 and the robot 3. Alternatively, the signal management unit 4 may be arranged at the machining center 2 or at the robot 3.

In the present invention, the number of the signal management units 4 in a machining system is not limited to one. As shown in FIGS. 16 to 19, the signal management unit 4 may be arranged as multiple distributed signal management units 4 in one machining system 1. By distributing the signal management unit 4 as multiple signal management units 4, load on one signal management unit can be reduced in response to a large quantity of information to be aggregated.

Figure 16:
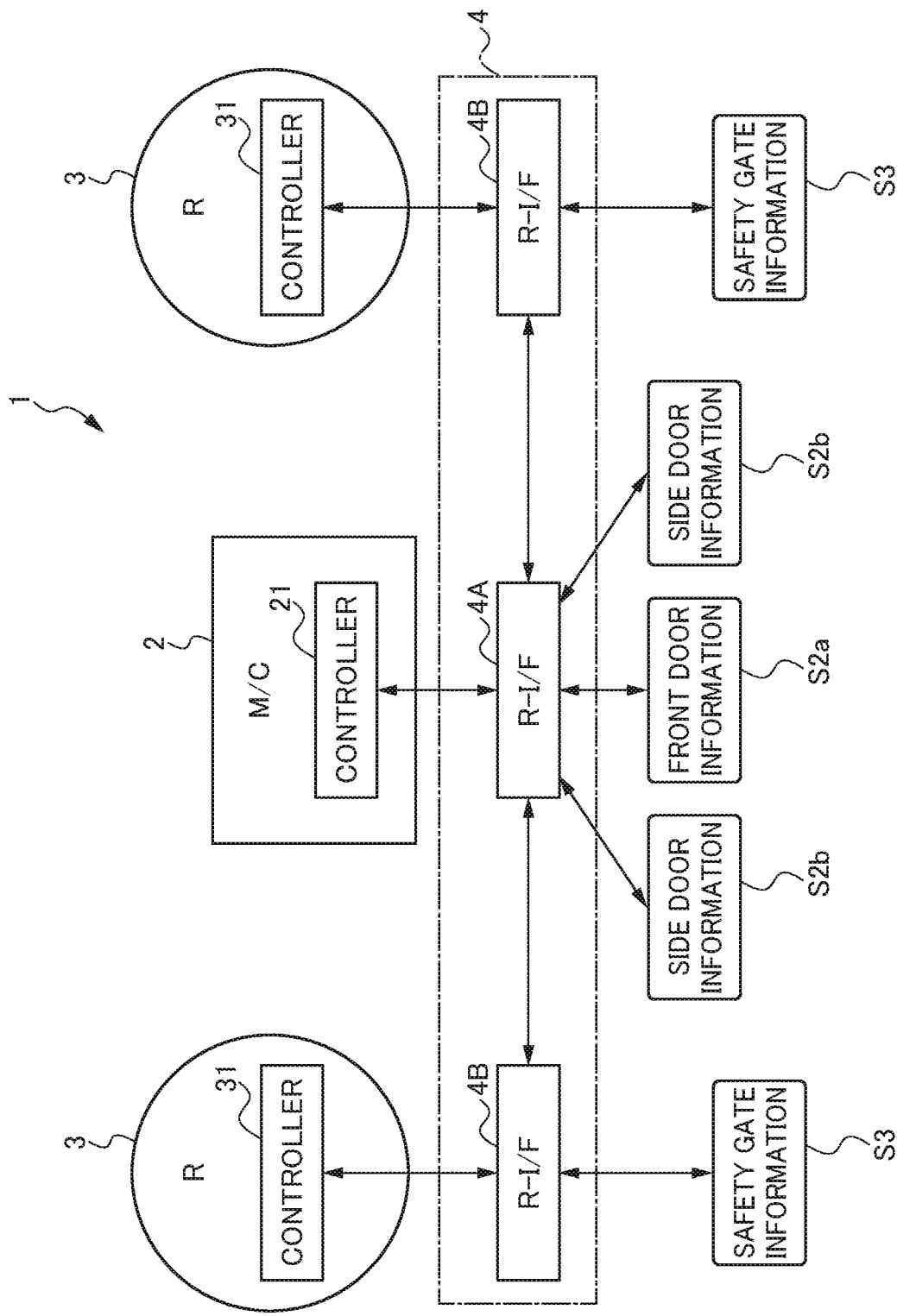
FIG. 16 is a block diagram showing the configuration of a machining system according to a seventh embodiment of the present invention.

FIG. 16 is a block diagram showing the configuration of a machining system 1 according to a seventh embodiment of the present invention. In this example, the signal management unit 4 is arranged as multiple distributed signal management units 4 in the machining system 1 according to the fourth embodiment shown in FIG. 10. The signal management unit 4 of the seventh embodiment is divided into one signal management unit 4A for one machining center 2, and two signal management units 4B, 4B for corresponding two robots 3, 3. The signal management unit 4A is configured to receive signals indicating front door information S2a and side door information S2b, S2b about the corresponding machining center 2. The signal management units 4B, 4B are configured to receive signals indicating safety gate information S3, S3 about the corresponding robots 3, 3.

The signal management units 4A and 4B, 4B are connected in such a manner that a received signal can be transferred between the signal management units 4A and 4B, 4B and shared by the signal management units 4A and 4B, 4B. By doing so, the three signal management units 4A and 4B, 4B substantially function as one signal management unit 4 in the machining system 1. Thus, based on a combination of the received front door information S2a, side door information S2b, S2b, and safety gate information S3, S3, each of the three signal management units 4A and 4B, 4B can output a signal indicating an operable state or an inoperable state of the machining center 2 and the robots 3, 3 to a corresponding one of the controllers 21 and 31, 31 at the machining center 2 and the robots 3 respectively.

Figure 17:
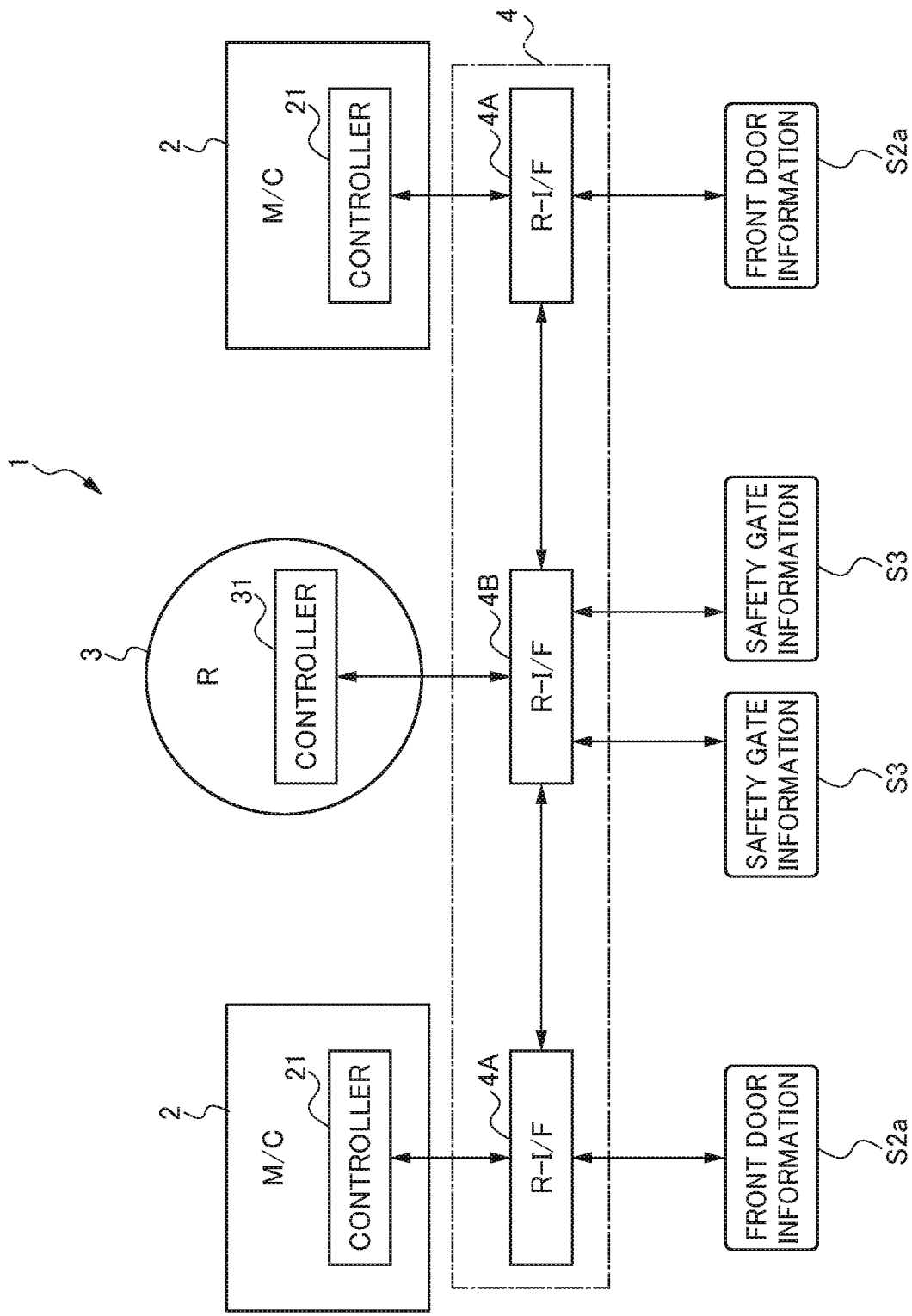
FIG. 17 is a block diagram showing the configuration of a machining system according to an eighth embodiment of the present invention.

FIG. 17 is a block diagram showing the configuration of a machining system 1 according to an eighth embodiment of the present invention. In this example, the signal management unit 4 is arranged as multiple distributed signal management units 4 in the machining system 1 according to the sixth embodiment shown in FIG. 14. The signal management unit 4 of the eighth embodiment is divided into two signal management units 4A, 4A for corresponding two machining centers 2, 2 and one signal management unit 4B for one robot 3. The signal management units 4A, 4A are configured to receive signals indicating front door information S2a, S2a about the corresponding machining centers 2, 2. The signal management unit 4B is configured to receive signals indicating safety gate information S3, S3 about the corresponding robot 3.

The signal management units 4A, 4A and 4B are connected in such a manner that a received signal can be transferred between the signal management units 4A, 4A and 4B and shared by the signal management units 4A, 4A and 4B. By doing so, the three signal management units 4A, 4A and 4B substantially function as one signal management unit 4 in the machining system 1. Thus, based on a combination of the received front door information S2a, S2a and safety gate information S3, S3, each of the three signal management units 4A, 4A and 4B can output a signal indicating an operable state or an inoperable state of the machining centers 2, 2 and the robot 3 to a corresponding one of the controllers 21, 21 and 31 at the machining centers 2, 2 and the robot 3 respectively.

Figure 18:
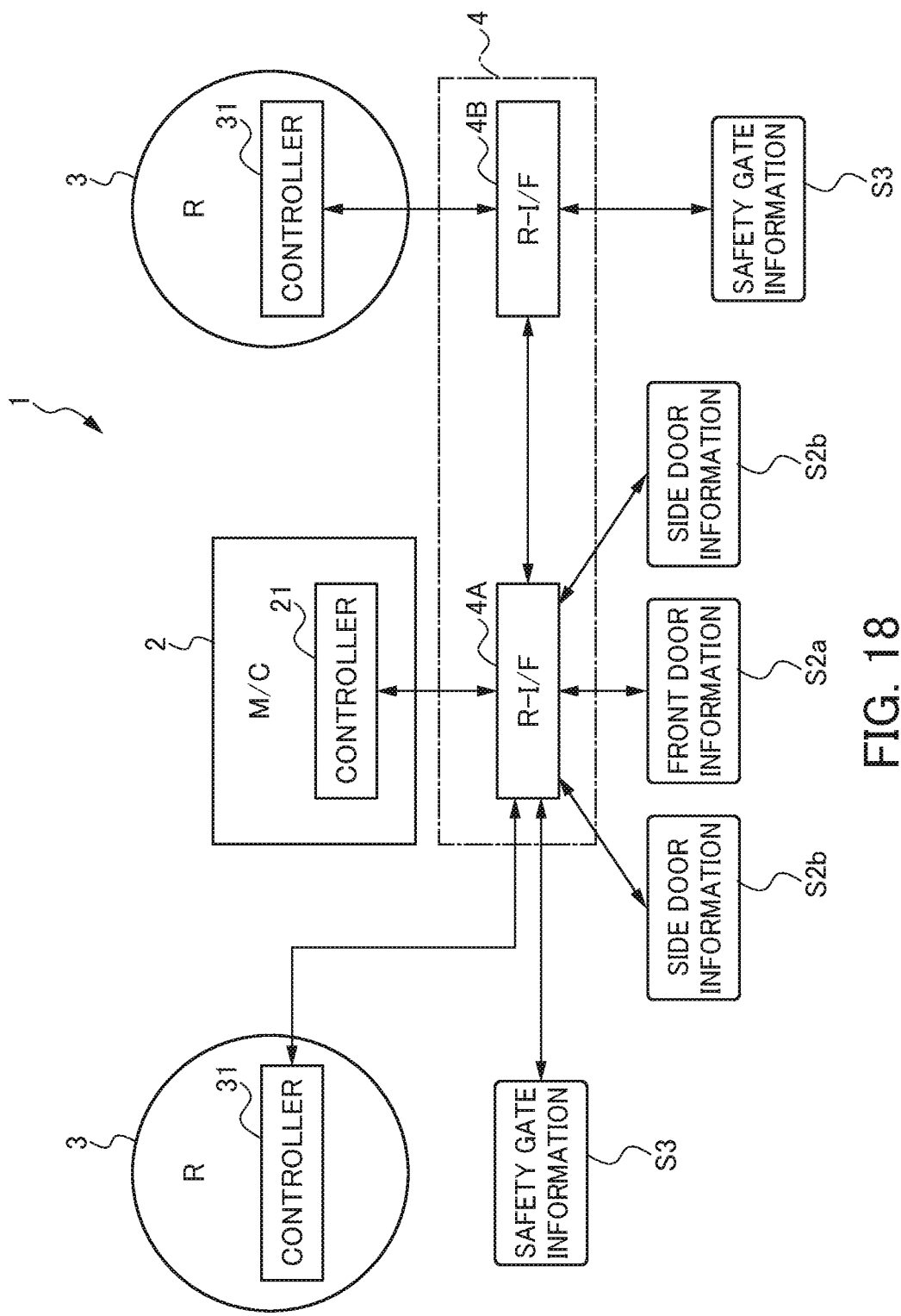
FIG. 18 is a block diagram showing the configuration of a machining system according to a ninth embodiment of the present invention.
Figure 19:
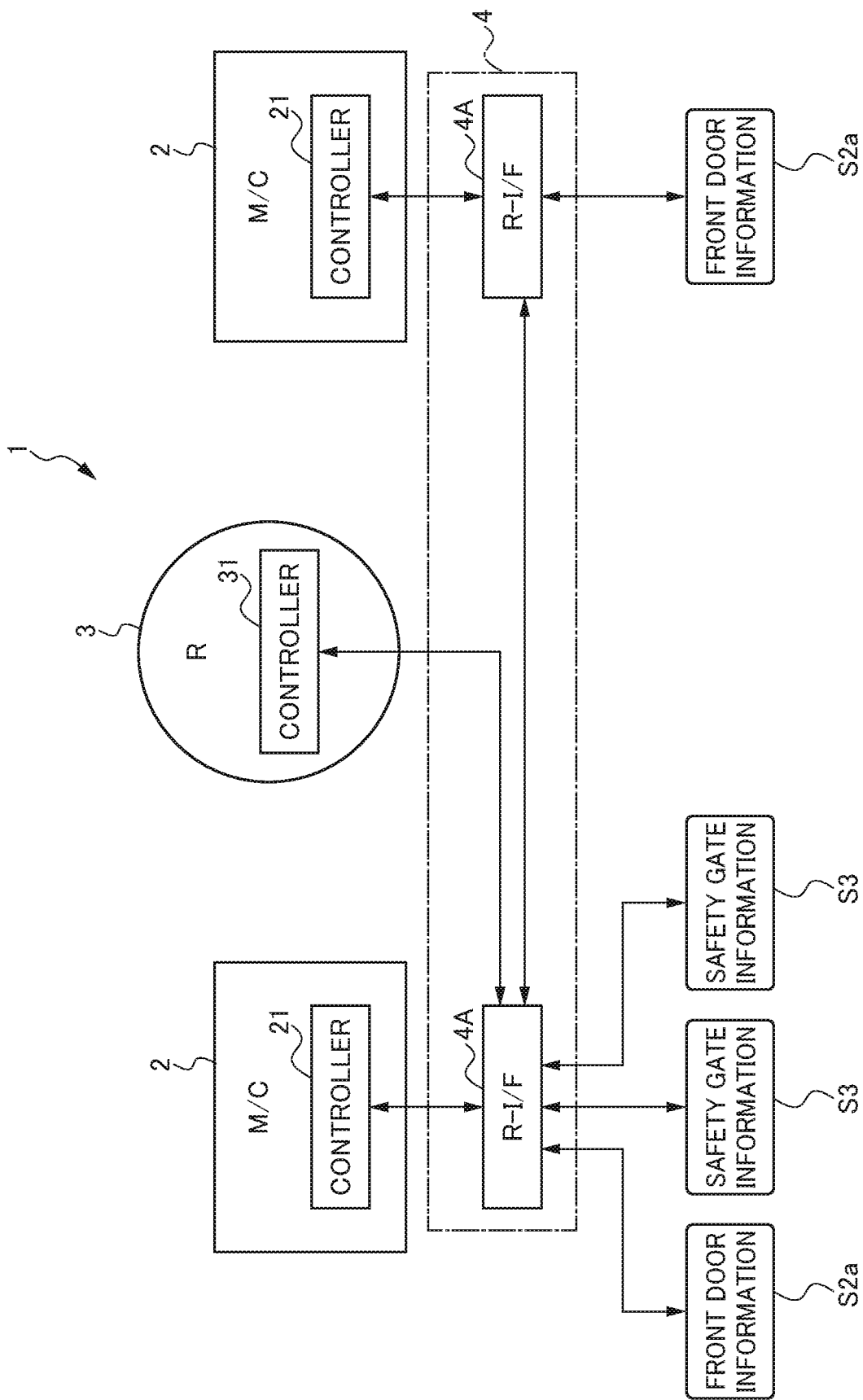
FIG. 19 is a block diagram showing the configuration of a machining system according to a tenth embodiment of the present invention.

If multiple signal management units 4 are provided in the machining system 1 like in the foregoing cases, the signal management units 4 are not always required to be arranged in a one-to-one relationship with the machining center 2 and the robot 3 as shown in FIGS. 18 and 19, for example.

FIG. 18 is a block diagram showing the configuration of a machining system 1 according to a ninth embodiment of the present invention. In this example, the signal management unit 4 is arranged as multiple distributed signal management units 4 in the machining system 1 according to the fourth embodiment shown in FIG. 10. The signal management unit 4 of the ninth embodiment includes one signal management unit 4A shared by one machining center 2 and one robot 3, and one signal management unit 4B for the remaining one robot 3. These two signal management units 4A and 4B are also connected in such a manner that a received signal can be transferred between the signal management units 4A and 4B and shared by the signal management units 4A and 4B. By doing so, like in the foregoing cases, the two signal management units 4A and 4B substantially function as one signal management unit 4 in the machining system 1. Thus, based on a combination of the received front door information S2a, side door information S2b, S2b, and safety gate information S3, S3, the two signal management units 4A and 4B can output a signal indicating an operable state or an inoperable state of the machining center 2 and the robots 3, 3 to the corresponding controllers 21 and 31, 31 at the machining center 2 and the robots 3, 3 respectively.

FIG. 19 is a block diagram showing the configuration of a machining system 1 according to a tenth embodiment of the present invention. In this example, the signal management unit 4 is arranged as multiple distributed signal management units 4 in the machining system 1 according to the sixth embodiment shown in FIG. 14. The signal management unit 4 of the tenth embodiment includes two signal management units 4A, 4A arranged for corresponding two machining centers 2, 2. One of these signal management units 4A, 4A is configured to be shared by the robot 3. These two signal management units 4A, 4A are also connected in such a manner that a received signal can be transferred between the signal management units 4A, 4A and shared by the signal management units 4A, 4A. By doing so, like in the foregoing cases, the two signal management units 4A, 4A substantially function as one signal management unit 4 in the machining system 1. Thus, based on a combination of the received front door information S2a, S2a and safety gate information S3, S3, the two signal management units 4A, 4A can output a signal indicating an operable state or an inoperable state of the machining centers 2, 2 and the robot 3 to the corresponding controllers 21, 21 and 31 at the machining centers 2, 2 and the robot 3 respectively.

In each of the embodiments described above, the robot 3 may have an area sensor for detecting approach by a worker in a non-contact manner instead of or in addition to a safety gate. In this case, instead of or in addition to information about an open/closed state of the safety gate, the signal management unit 4 may receive a signal indicating information about detection or non-detection by the area sensor as a criterion used for determining whether the robot 3 is operable or inoperable.

The machining system 1 described above includes the machining center 2 as an example of a machine tool and the robot 3 as an example of an auxiliary device. However, this is not the only case. The machine tool according to the present invention may be any machine for machining or manufacture of a machining target by cooperative work with the auxiliary device. Such a machine tool is not limited to a machine such as a machining center or a wirecut electrical discharge machine but may also be an injection molding machine or a 3D printer, for example.

The auxiliary device according to the present invention is required to be a device to assist in machining work by a machine tool. More specifically, the auxiliary device may be a transfer device other than a robot to transfer a machining target, a tool, etc. into and out of a machine tool, an image capture device to capture an image of the interior of a machine tool, a measurement device to make various measurements on a machining target machined or manufactured by a machine tool, or a cleaning device to clean the interior of a machine tool, for example. Thus, auxiliary work to be done by the auxiliary device according to the present invention is not limited to work of exchanging or taking out a machining target. The auxiliary work may be work of exchanging a machining tool or a different component of a machine tool, work of checking the interior of a machine tool, work of making measurements on a machining target, or work of cleaning the interior of a machine tool, for example.

An operable state or an inoperable state of the machine tool and the auxiliary device according to the present invention is not limited to the foregoing state of the machine tool and the auxiliary device relating to safety of a worker. An operable state or an inoperable state of the machine tool and the auxiliary device may be a normal state or an abnormal state of the machine tool and the auxiliary device, for example. More specifically, the abnormal state of the machine tool and the auxiliary device may be failure to grasp a work with a fixture or a robot hand, failure to grasp a tool with a spindle of the machine tool, excessively accumulated chips, or a defect of a machining target, for example.

EXPLANATION OF REFERENCE NUMERALS

1 Machining system
2 Machining center (machine tool)
21 Numerical controller (machine tool controller)
22 Power supply
3 Robot (auxiliary device)
31 Robot controller (auxiliary device controller)
32 Power supply
4, 4A, 4B Signal management unit
5 Power supply
S2a Front door information (information about the machine tool as a criterion used for determining whether the machine tool and the auxiliary device are operable or inoperable)
S2b Side door information (information about the machine tool as a criterion used for determining whether the machine tool and the auxiliary device are operable or inoperable)
S3 Safety gate information (information about the auxiliary device as a criterion used for determining whether the machine tool and the auxiliary device are operable or inoperable)

What is claimed is:

1. A machining system comprising a machine tool, a machine tool controller that controls the machine tool, an auxiliary device that assists the machine tool, and an auxiliary device controller that controls the auxiliary device, the machine tool and the auxiliary device working cooperatively for machining, the machining system comprising:

a signal management unit that receives a first signal and a second signal, the first signal indicating information about the machine tool as a criterion used for determining whether the machine tool and the auxiliary device are operable or inoperable, the second signal indicating information about the auxiliary device as a criterion used for determining whether the machine tool and the auxiliary device are operable or inoperable, wherein the signal management unit outputs a third signal to the machine tool controller and the auxiliary device controller, the third signal independently indicating an operable state or an inoperable state of the machine tool based on the first signal and an operable state or an inoperable state of the auxiliary device based on the second signal.

2. The machining system according to claim 1, wherein the machine tool has an openable/closable door,
the auxiliary device has an openable/closable safety gate and/or an area sensor,
the information about the machine tool is information about an open/closed state of the door, and
the information about the auxiliary device is information about an open/closed state of the safety gate and/or information about detection or non-detection by the area sensor.

3. The machining system according to claim 1, wherein the signal management unit is divided into a first region in which the first signal is received and a second region in which the second signal is received,
the first region of the signal management unit receives power supply from the machine tool, and
the second region of the signal management unit receives power supply from the auxiliary device.

4. The machining system according to claim 1, wherein the signal management unit is operated by power supply from the machine tool, by power supply from the auxiliary device, or by power supply independent of the machine tool and the auxiliary device.

5. The machining system according to claim 1, wherein the signal management unit is provided at the machine tool or the auxiliary device, or independently of the machine tool and the auxiliary device.

6. The machining system according to claim 1, wherein the third signal indicates an operable state of both the machine tool and the auxiliary device.

7. The machining system according to claim 1, wherein the third signal indicates an inoperable state of both the machine tool and the auxiliary device.

8. The machining system according to claim 1, wherein the third signal indicates an inoperable state of the machine tool and an operable state of the auxiliary device.

9. The machining system according to claim 1, wherein the third signal indicates an operable state of the machine tool and an inoperable state of the auxiliary device.

\* \* \* \* \*